United States Patent
Chuang et al.

(10) Patent No.: US 8,379,977 B2
(45) Date of Patent: Feb. 19, 2013

(54) METHOD FOR REMOVING COLOR FRINGE IN DIGITAL IMAGE

(75) Inventors: Che-Lun Chuang, Hsinchu (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 544 days.

(21) Appl. No.: 12/767,553

(22) Filed: Apr. 26, 2010

(65) Prior Publication Data

US 2011/0158515 A1 Jun. 30, 2011

(30) Foreign Application Priority Data

Dec. 30, 2009 (TW) .............................. 98146001 A

(51) Int. Cl.
*G06K 9/36* (2006.01)
(52) U.S. Cl. ....................................... 382/167
(58) Field of Classification Search ............... None
See application file for complete search history.

(56) References Cited

U.S. PATENT DOCUMENTS

| | | | | |
|---|---|---|---|---|
| 8,237,823 B2 * | 8/2012 | Kang et al. | ..................... | 348/242 |
| 2007/0009176 A1 * | 1/2007 | Lim et al. | ..................... | 382/275 |
| 2007/0097267 A1 | 5/2007 | Sakurai et al. | | |
| 2007/0153341 A1 * | 7/2007 | Kang | ............................. | 358/529 |
| 2009/0189997 A1 * | 7/2009 | Stec et al. | ................... | 348/222.1 |
| 2009/0273690 A1 * | 11/2009 | Nashizawa | ..................... | 348/242 |
| 2010/0080458 A1 * | 4/2010 | Yamada et al. | ............... | 382/167 |
| 2010/0303350 A1 * | 12/2010 | Demandolx | .................. | 382/167 |
| 2012/0120245 A1 * | 5/2012 | Zhao et al. | ..................... | 348/164 |

OTHER PUBLICATIONS

Soon-Wook Chung et al., Detecting and Eliminating Chromatic Aberration in Digital Images, IEEE Publication, 2009, pp. 3905-3908.*

Baek-Kyu Kim et al., Automatic Detection and Correction of Purple Fringing Using the Gradient Information and Desaturation), 16the European Signal processing Conference, Lausanne, Switzerland, Aug. 25-29, 2008, 5 pages.*

* cited by examiner

*Primary Examiner* — Brian P Werner
(74) *Attorney, Agent, or Firm* — Morris Manning & Martin LLP; Tim Tingkang Xia, Esq.

(57) ABSTRACT

A method for removing color fringe is presented. First, detection and correction of color fringe are performed on an original-size image and a small-size image respectively, so as to generate respective corrected images and corresponding color fringe maps. Then, the corrected small-size image and its corresponding color fringe map are enlarged to the same resolution as the original-size image. Finally, the two corrected images are blended according to the respective corresponding color fringe maps.

16 Claims, 19 Drawing Sheets

| P00 | P01 | P02 | P03 | P04 |
|-----|-----|-----|-----|-----|
| P10 | P11 | P12 | P13 | P14 |
| P20 | P21 | P22 | P23 | P24 |
| P30 | P31 | P32 | P33 | P34 |
| P40 | P41 | P42 | P43 | P44 |

FIG. 9

METHOD FOR REMOVING COLOR FRINGE IN DIGITAL IMAGE

CROSS-REFERENCE TO RELATED APPLICATIONS

This non-provisional application claims priority under 35 U.S.C. §119(a) on Patent Application No(s). 098146001 filed in Taiwan, R.O.C. on Dec. 30, 2009, the entire contents of which are hereby incorporated by reference.

BACKGROUND OF THE INVENTION

1. Field of Invention

The present invention relates to an image processing method, and more particularly to a method for removing color fringe in a digital image.

2. Related Art

Color fringe is caused by incorrect setting of color at some positions of an image in an image system.

In a camera, color fringe is mainly resulted from lens aberration, sensor blooming, and color filter array interpolation (CFAI).

As glass has different refraction levels for light having different wavelengths, color fringe occurs to an image formed by a lens (a non-planar mirror). Thereby, the edges of an object are blurred due to a failure in precise calibration of different colors caused by lens aberration.

A sensor is a core member of a digital camera. In the digital camera, the sensor is used for capturing light rays passing through the lens and converting the light rays into electric signals. When the light rays are converged on the sensor through the lens, photodiodes of the sensor sense different quantities of charges under different light intensities and temporarily store the quantities of charges in a memory. After the quantities of charges are temporarily stored in the memory, a charge transfer circuit and a charge information read circuit then read the charge information in a clock pulse sequence and send the charge information to an analog-to-digital converter (A/D converter), so as to convert the charge information into a binary digit (that is, an electric signal) proportional to the light intensity. Moreover, the binary digit is data corresponding to a pixel. However, each photodiode can merely accumulate a certain quantity of charges within an exposure period. In a high luminance area, on one pixel, when the quantity of generated charges is too large and becomes saturated, the excessive charges may overflow to adjacent pixels and cause errors in data of the adjacent pixels. This phenomenon is referred to as blooming.

When color fringe occurs to a pixel and CFAI is performed, an incorrect pixel value is generated according to the wrong color, thus causing color fringe in the adjacent pixels.

In the prior art, a red, green, and blue (R/G/B) signal is generally used for detection, so as to find pixels with color fringe. However, as color fringe usually occurs in a bright area, the method may result in a failure of discovering a part of pixels with color fringe, let alone correcting these pixels.

Moreover, in the prior art, the correction method is a chrominance (Cb and Cr) suppression method or a method of suppressing red (R) signals and blue (B) signals to green (G) signals. Both methods may result in grayish images after correction.

Related technologies can be referred to in US Patent Application Publication No. 2007/0153341 and 2007/0097267.

SUMMARY OF THE INVENTION

Accordingly, the present invention is a method for removing color fringe in a digital image, so as to solve at least one of the problems in the prior art.

The present invention provides a method for removing color fringe in a digital image, which comprises the following steps. A digital image is obtained. A variable-size image is formed by reducing the digital image. Detection of color fringe is performed on the digital image, so as to find pixels with color fringe in the digital image, set each of the found pixels with color fringe as a color fringe pixel, and generate a color fringe map corresponding to the digital image according to a position of the color fringe pixel in the digital image. Detection of color fringe is performed on the variable-size image, so as to find pixels with color fringe in the variable-size image, set each of the found pixels with color fringe as a color fringe pixel, and generate a color fringe map corresponding to the variable-size image according to a position of the color fringe pixel in the variable-size image. The color fringe pixel in the digital image is corrected through a correction procedure, so as to obtain the corrected digital image. The color fringe pixel in the variable-size image is corrected through a correction procedure, so as to obtain the corrected variable-size image. The corrected variable-size image and the color fringe map corresponding to the variable-size image are enlarged, so that the corrected variable-size image and the color fringe map corresponding to the variable-size image have the same resolution as the digital image. The corrected digital image and the enlarged corrected variable-size image are blended according to the color fringe map corresponding to the digital image and the enlarged color fringe map corresponding to the variable-size image.

The corrected variable-size image and the color fringe map corresponding to the variable-size image may be linearly enlarged.

The detection of color fringe comprises the following steps. A separated luminance and chrominance signal of each pixel is analyzed through specific color detection, luminance detection, and gradient color detection, so as to determine whether color fringe occurs to each pixel in the digital image, and set the pixel determined to have no color fringe according to results of the specific color detection, the luminance detection, and the gradient color detection as a normal pixel. The pixel determined to have color fringe according to all the results of the specific color detection, the luminance detection, and the gradient color detection is set as a color fringe pixel.

The specific color detection comprises the following steps. A chrominance value of the separated luminance and chrominance signal of each pixel that is not set is analyzed according to chrominance ranges of multiple colors. It is determined that color fringe occurs to the pixel having the chrominance value falling in the chrominance ranges of the multiple colors. It is determined that color fringe does not occur to the pixel having the chrominance value falling out of the chrominance ranges of the multiple colors.

The luminance detection comprises the following steps. A luminance value of the separated luminance and chrominance signal of each pixel that is not set is analyzed by using a K×K mask, so as to find a pixel located in a high contrast area and a high luminance area among the pixels that are not set. It is determined that color fringe occurs to the pixel located in the high contrast area and the high luminance area.

The gradient color detection comprises the following steps. The luminance value and the chrominance value of the separated luminance and chrominance signal of each pixel that is not set are analyzed by using an M×M mask, so as to find a pixel located in a non-smooth area, a gradational color area, an area appearing gradational variation from bright to dark, and an adjacent area appearing bright neutral color among the pixels determined to have no color fringe. It is determined that color fringe occurs to the pixel located in the non-smooth area, the gradational color area, the area appearing gradational variation from bright to dark, and the adjacent area appearing bright neutral color.

In addition, reduction of various sizes can be performed on a digital image having a first resolution to form (n−1) variable-size images having a second resolution to an $n^{th}$ resolution respectively, in which n is an integer greater than 2. The first resolution is a random multiple greater than 1 of the second resolution, and the resolutions gradually decrease from the second to the $n^{th}$ resolution.

The corrected variable-size images and the corrected digital image are then blended according to respective color fringe maps in sequence starting from a minimum resolution among the first to $n^{th}$ resolutions to obtain an output image.

In the method for removing color fringe in a digital image according to the present invention, detection and correction of color fringe are performed on an original-size image and a small-size image (that is, a digital image and a variable-size image) respectively, so as to generate respective corrected images and corresponding color fringe maps. Then, the corrected small-size image and its corresponding color fringe map are enlarged to the same resolution as the original-size image. Finally, the two corrected images are blended according to the respective corresponding color fringe maps. Compared with the original-size image, for the small-size image, a mask of the same size may cover more image frames. Therefore, the detection and correction of color fringe can be performed on an image with a small-size mask, so as to effectively remove color fringe in the digital image and obtain a bright color after correction, instead of, for example, being grayish. Moreover, the use of the small-size mask also effectively reduces the cost.

BRIEF DESCRIPTION OF THE DRAWINGS

The present invention will become more fully understood from the detailed description given herein below for illustration only, and thus are not limitative of the present invention, and wherein:

FIG. 9 is a schematic view of pixels covered by a 5×5 mask;

DETAILED DESCRIPTION OF THE INVENTION

A method for removing color fringe in a digital image according to the present invention is applicable to an electronic computing device, so as to perform color fringe correction on a digital image input into the electronic computing device by using the same. In other words, the method for removing color fringe in a digital image according to the present invention can be stored in a storage unit (for example, a memory or a hard disk) of the electronic computing device in the form of a software or firmware program, and a processor of the electronic computing device executes the stored software or firmware program to implement the method. The electronic computing device may be a computer, a mobile phone, a personal digital assistant (PDA), a digital camera, or other electronic apparatus.

Figure 1:
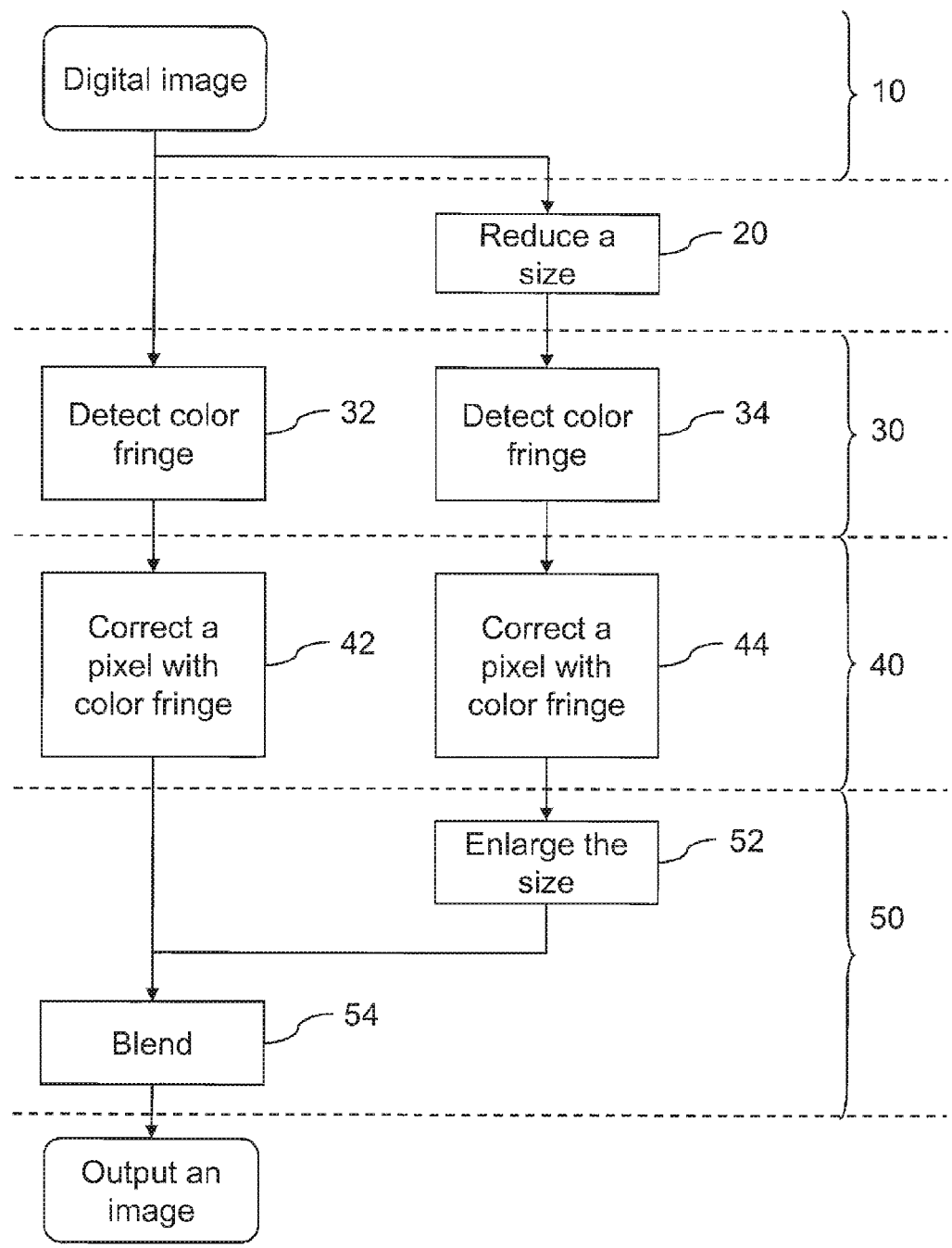
FIG. 1 is a schematic flow chart of a method for removing color fringe in a digital image according to an embodiment of the present invention.

FIG. 1 is a flow chart of a method for removing color fringe in a digital image according to an embodiment of the present invention.

Referring to FIG. 1, an electronic computing device comprises an input unit to obtain a digital image (Step 10). The input unit is an image capturing unit or a wired or wireless transmission interface.

Alternatively, a processor reads from a storage unit a digital image pre-stored in the storage unit, so as to obtain a digital image (Step 10).

The electronic computing device further comprises a signal converting unit. The signal converting unit receives the digital image, and converts each pixel of the digital image from an RGB signal into a separated luminance and chrominance (YCbCr) signal.

In a common 8-bit processing system, a value of the RGB signal is a positive integer between 0 and 255; while for the YCbCr signal, a value of the Y (luminance) signal is in a range of 0 to 255, and values of the Cb and Cr (chrominance) signals are in a range of −127 to 127, in which the values of the Y, Cb, and Cr signals are all integers.

Signals converted by the signal converting unit are used to analyze the content of the image so as to detect and correct pixels with color fringe.

If the obtained digital image is already a YCbCr signal, the signal converting unit is unnecessary.

Here, the signal converting unit may be integrated in the processor or implemented with another processor.

Next, a variable-size image is formed by reducing a size of a digital image (Step 20). Here, the digital image has a first resolution, the variable-size image has a second resolution, and the first resolution is greater than the second resolution. In other words, the digital image having the first resolution and the variable-size image having the second resolution are the same image having different sizes. That is, the digital image having the first resolution is a large-size image, and the variable-size image having the second resolution is a small-size image. The first resolution may be a random multiple of the second resolution.

Detection of color fringe is performed on the digital image and the variable-size image, that is, detection of color fringe is performed on each pixel in each image (the digital image or the variable-size image), so as to find pixels with color fringe, set each of the found pixels with color fringe as a color fringe pixel, and generate a corresponding color fringe map according to a position of the color fringe pixel in the image (Step 30).

The color fringe pixels in each image are corrected to generate the corrected image (the corrected digital image or the corrected variable-size image) (Step 40).

In other words, after the detection of color fringe and the correction of the pixels with color fringe of the digital image having the first resolution, the corrected digital image having the first resolution and its corresponding color fringe map are obtained (Steps 32 and 42). After the detection of color fringe and the correction of pixels with color fringe of the variable-size image having the second resolution, the corrected variable-size image having the second resolution and its corresponding color fringe map are obtained (Steps 34 and 44).

The corrected variable-size image and the corrected digital image are then blended according to the respective color fringe maps (Step 50).

In Step 50, the corrected variable-size image having the second resolution and its corresponding color fringe map are first enlarged to the first resolution, so as to obtain the corrected variable-size image having the first resolution and its corresponding color fringe map (Step 52). Here, the corrected variable-size image and the color fringe map can be linearly enlarged.

The corrected digital image having the first resolution and the corrected variable-size image having the first resolution are then blended according to the respective corresponding color fringe maps to obtain an output image (Step 54).

Figure 2A:
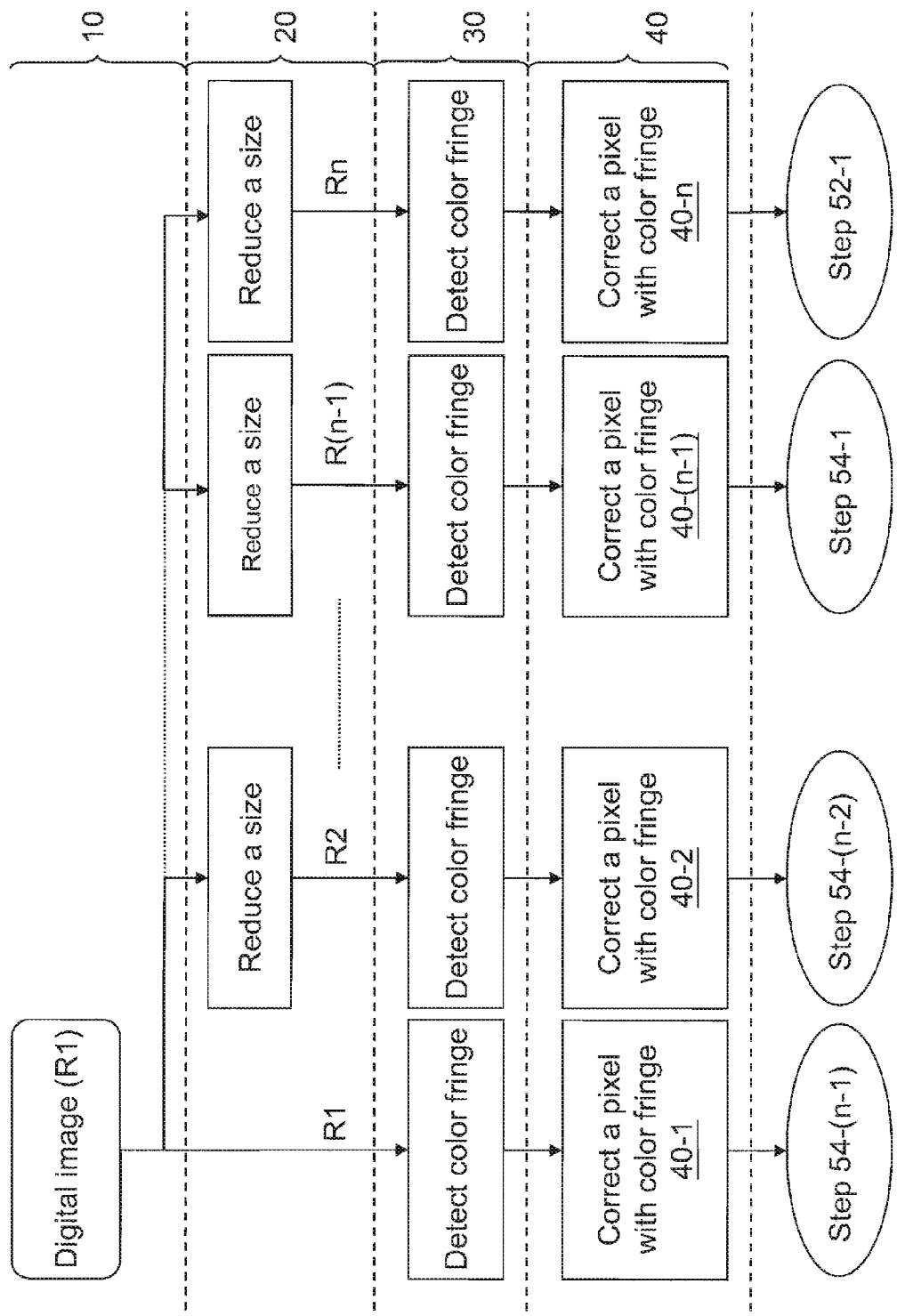
FIGS. 2A and 2B are schematic flow charts of a method for removing color fringe in a digital image according to another embodiment of the present invention.
Figure 2B:
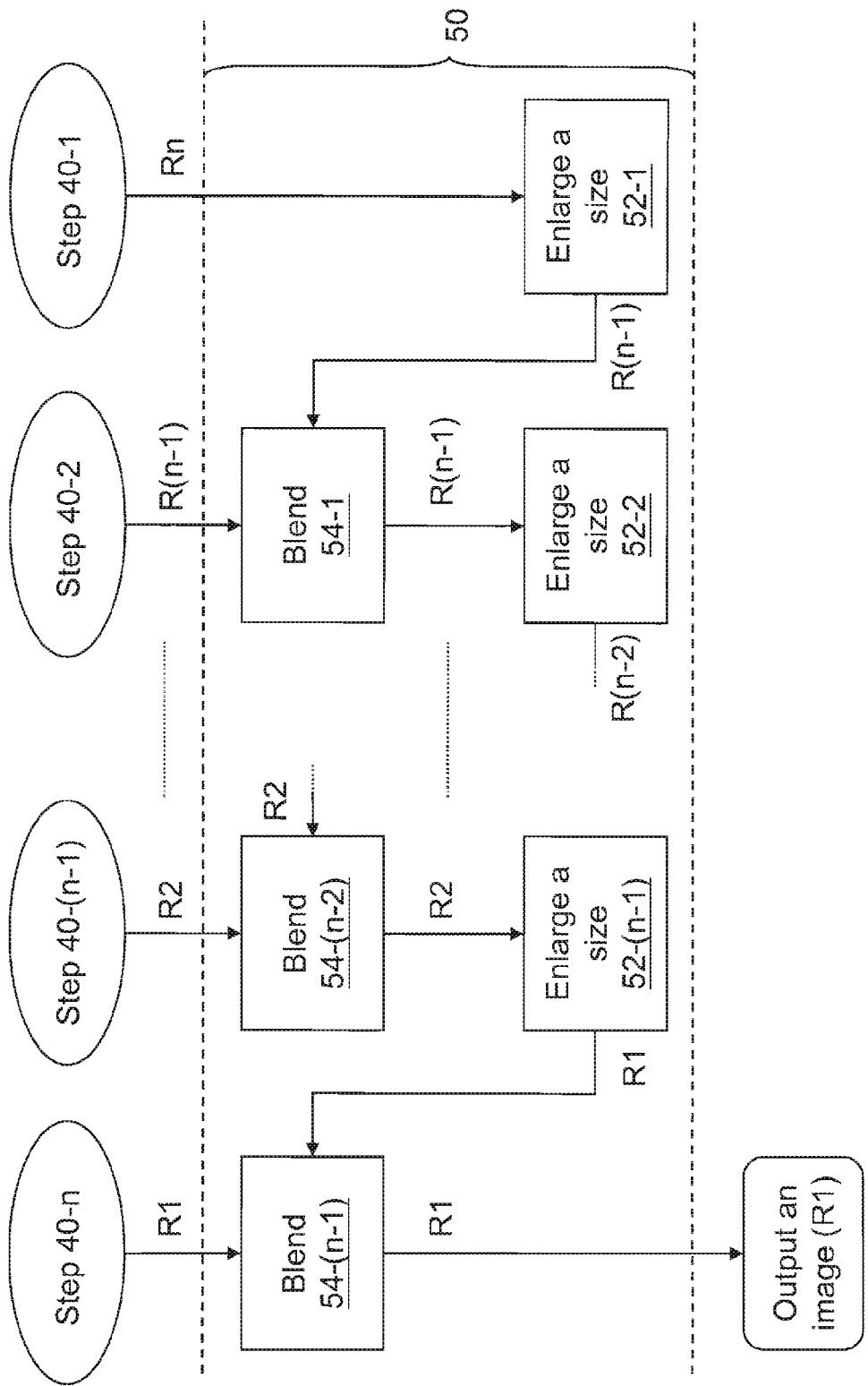

In addition, referring to FIG. 2A, in Step 20, reduction of various sizes may be performed to form (n−1) variable-size images having a second resolution R2 to an $n^{th}$ resolution Rn respectively, in which n is an integer greater than 2.

The first resolution R1 is a random multiple greater than 1 of the second resolution R2, and the resolutions gradually decrease from the second resolution R2 to the $n^{th}$ resolution Rn. For example, the second resolution R2 may be ½ of the first resolution R1, and the $n^{th}$ resolution Rn may be 1/27 of the first resolution R1.

Detection of color fringe is performed on the digital image having the first resolution R1 and the variable-size images having the second to $n^{th}$ resolutions (R2, ..., R(n−1), Rn) respectively (Step 30), and pixels with color fringe are corrected (Steps 40-1, 40-2, ..., 40-(n−1), 40-n).

In Step 50, the corrected variable-size images and the corrected digital image are blended according to the respective color fringe maps in sequence starting from a minimum resolution among the first resolution R1 to the $n^{th}$ resolution Rn, so as to obtain a blended image having the first resolution R1 (Steps 52-1 to 52-(n−1) and Steps 54-1 to 54-(n−1)). The blended image having the first resolution R1 is the output image.

Particularly, the corrected variable-size image having the minimum resolution and its corresponding color fringe map are first enlarged to a sequentially greater resolution. For the minimum resolution as the $n^{th}$ resolution Rn, the resolution before enlargement is the $n^{th}$ resolution Rn, and the resolution after enlargement is the $(n-1)^{th}$ resolution R(n−1). After the enlargement, the enlarged corrected variable-size image (that is, the enlarged corrected variable-size image having the $(n-1)^{th}$ resolution R(n−1)) and the corrected variable-size image having the same resolution (that is, the $(n-1)^{th}$ resolution R(n−1)) are blended according to the respective corresponding color fringe maps, so as to obtain a blended image having the $(n-1)^{th}$ resolution R(n−1) and its corresponding color fringe map.

Next, according to a sequence from the first to the $(n-1)^{th}$ resolution R1 to R(n−1), the newly obtained blended image and its corresponding color fringe map are enlarged to a sequentially greater resolution, and the corrected digital image and the corrected image having the same resolution among the variable-size images are then blended to obtain a new blended image and a color fringe map corresponding to the new blended image.

The above step is repeatedly performed until the blended image having the first resolution R1 is obtained to serve as the output image.

For ease of illustration, the digital image is referred to as a first image below, and the (n−1) variable-size images are referred to as a second image to an $n^{th}$ image respectively.

The first image to the $(n-1)^{th}$ image have the first resolution to the $n^{th}$ resolution (R1, R2, ..., R(n−1), Rn) respectively. That is, the first image has the first resolution R1, the second image has the second resolution R2, the third image has the third resolution R3, and in this manner, the $(n-1)^{th}$ image has the $(n-1)^{th}$ resolution R(n−1) and the $n^{th}$ image has the $n^{th}$ resolution Rn.

Next, the detection of color fringe and the correction of pixels with color fringe are performed on the images starting from the two smallest resolutions (that is, the $(n-1)^{th}$ resolution R(n−1) and the $n^{th}$ resolution Rn) (Step 30, Step 40-1, and Step 40-2). Further, the corrected $n^{th}$ image and its corresponding color fringe map are enlarged from the $n^{th}$ resolution Rn to the $(n-1)^{th}$ resolution R(n−1), so as to obtain the corrected $n^{th}$ image having the $(n-1)^{th}$ resolution R(n−1) and its corresponding color fringe map having the same size (Step 52-1).

The corrected $n^{th}$ image having the $(n-1)^{th}$ resolution R(n−1) and the corrected $(n-1)^{th}$ image are then blended according to the respective corresponding color fringe maps, so as to obtain a blended image having the $(n-1)^{th}$ resolution R(n−1) and a color fringe map corresponding to the blended image (Step 54-1). For ease of illustration, the obtained blended image having the $(n-1)^{th}$ resolution R(n−1) is referred to as the $(n-1)^{th}$ blended image below.

Afterward, the detection of color fringe and the correction of pixels with color fringe are performed on the $(n-2)^{th}$ image having the $(n-2)^{th}$ resolution R(n−2), so as to obtain the corrected $(n-2)^{th}$ image having the $(n-2)^{th}$ resolution R(n−2) and its corresponding color fringe map (Steps 30 and 40). Further, the $(n-1)^{th}$ blended image and its corresponding color fringe map are enlarged from the $(n-1)^{th}$ resolution R(n−1) to the $(n-2)^{th}$ resolution R(n−2), so as to obtain the $(n-1)^{th}$ blended image having the $(n-2)^{at}$ resolution R(n−2) and its corresponding color fringe map having the same size (Step 52-2).

The $(n-1)^{th}$ blended image having the $(n-2)^{th}$ resolution R(n−2) and the corrected $(n-2)^{th}$ image are then blended according to the respective corresponding color fringe maps, so as to obtain the $(n-2)^{th}$ blended image having the $(n-2)^{th}$ resolution R(n−2) and its corresponding color fringe map (Step 50, which can be deduced from the above as Step 54-2 (not shown)).

The images are blended in sequence according to the above steps (that is, the enlargement and blending are repeatedly performed) until the second blended image having the second resolution R2 and its corresponding color fringe map obtained through the blending in Step 54-(n−2) are enlarged to the first resolution R1 (Step 52-(n−1)), and the second blended image having the first resolution R1 and the corrected first image having the same first resolution R1 are then blended to obtain a first blended image having the first resolution R1 (Step 54-(*n*–1)). The first blended image having the first resolution R1 is the final output image.

Figure 3:
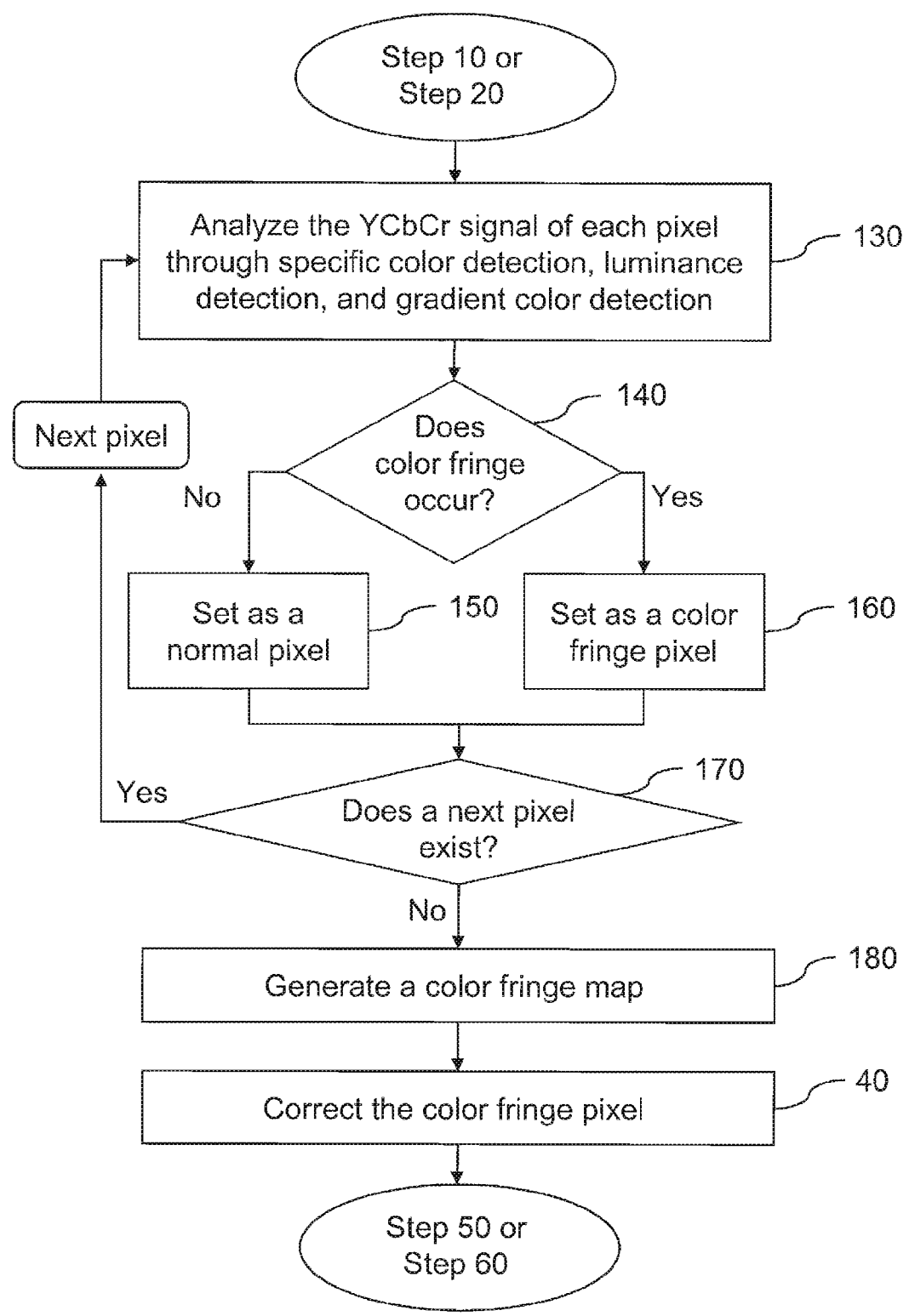
FIG. 3 is a flow chart of a detection procedure of color fringe according to an embodiment of the present invention.

Referring to FIG. 3, in the detection of color fringe of each pixel, the YCbCr signal of each pixel is analyzed through specific color detection, luminance detection, and gradient color detection (Step 130), so as to determine whether color fringe occurs to each pixel in the image (Step 140).

Moreover, the pixel determined to have no color fringe according to results of the specific color detection, the luminance detection, and the gradient color detection is set as a normal pixel (Step 150). The pixel determined to have color fringe according to all the results of the specific color detection, the luminance detection, and the gradient color detection is set as a color fringe pixel, and a position of the pixel with color fringe is recorded (Step 160).

Finally, a color fringe map is generated according to the recorded position of the pixel with color fringe (Step 180), a value of the normal pixel is reserved, and the color fringe pixel is corrected (Step 40) to obtain the corrected image.

In Step 130, the specific color detection, the luminance detection, and the gradient color detection can be performed in a random sequence.

For ease of illustration, an example is given below, in which the specific color detection, the luminance detection, and the gradient color detection are performed in sequence.

Figure 4A:
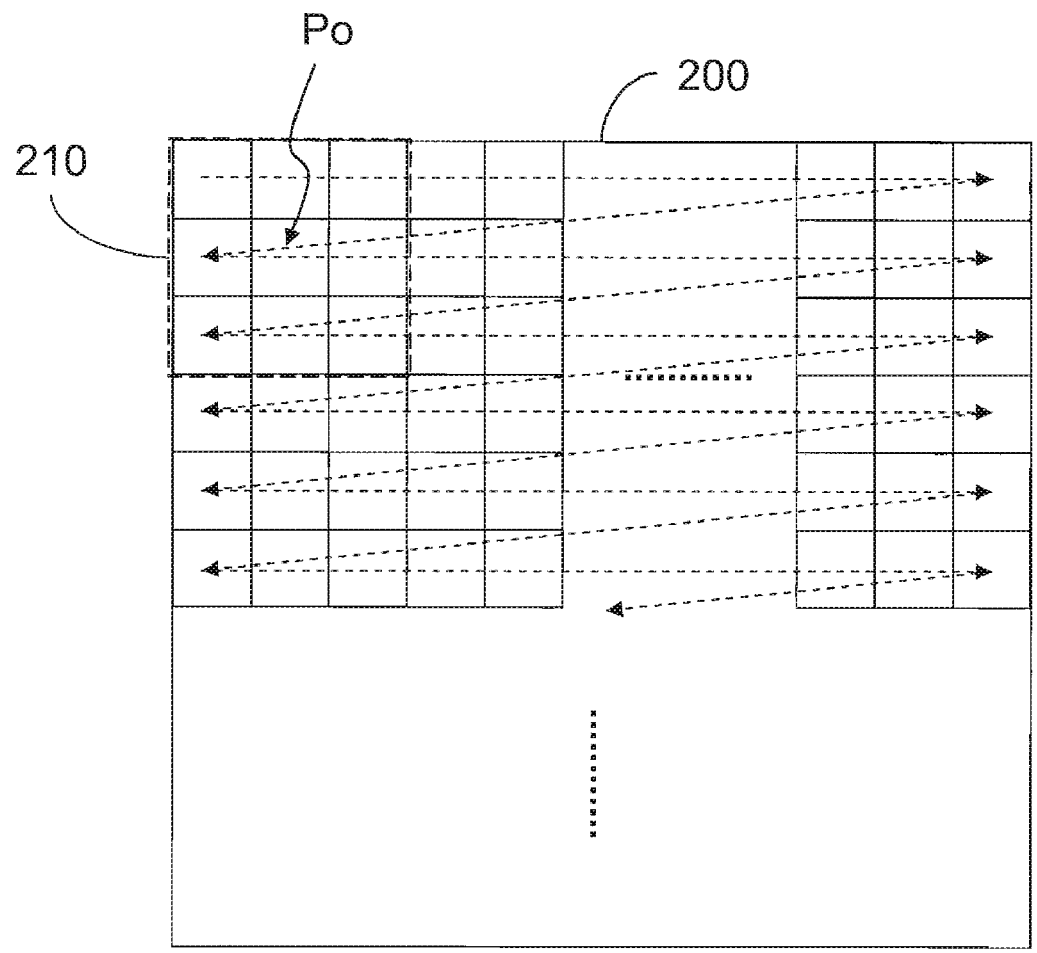
FIG. 4A is a schematic view of a detection sequence of all pixels in a digital image according to an embodiment of the present invention.

Referring to FIG. 4A, detection of color fringe is performed on pixels in an image 200 (a digital image or a variable-size image) in sequence according to YCbCr signals of the pixels. In the luminance detection and gradient color detection, a mask 210 is spread with a pixel being detected as a center pixel Po, and detection of the center pixel Po is performed through the mask 210.

Figure 4B:
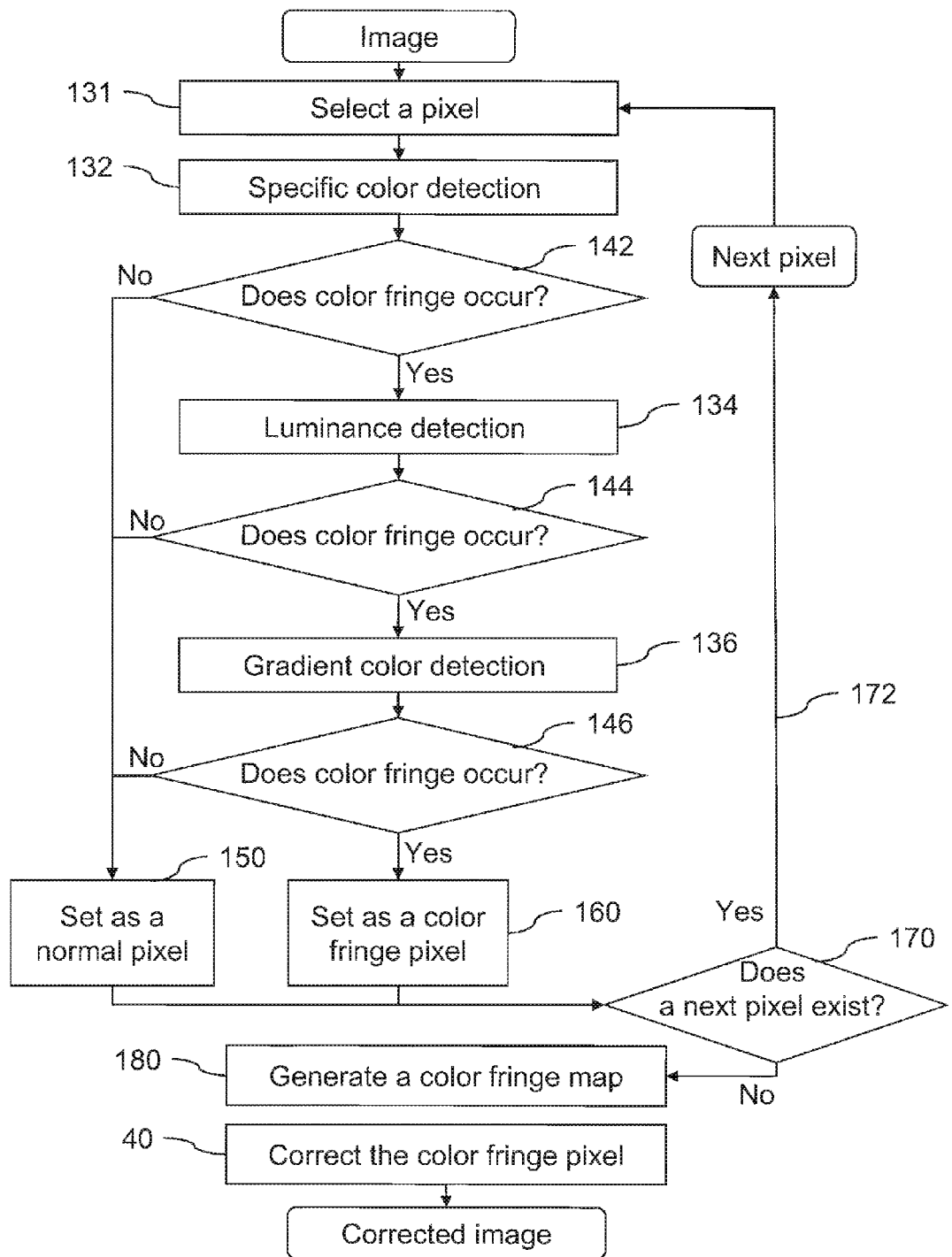
FIG. 4B is a flow chart of detection of color fringe according to an embodiment of the present invention.

Referring to FIG. 4B, firstly, a pixel is selected from the image (Step 131). The specific color detection is first performed on the selected pixel (Step 132), so as to determine whether a pixel with color fringe exits in the pixels (Step 142).

Moreover, the pixel determined to have no color fringe in the specific color detection is set as a normal pixel, and a set value thereof is recorded in a register (Step 150).

Next, the luminance detection is performed on the pixel with color fringe as determined in the specific color detection (Step 134), so as to determine whether a pixel with color fringe exists in the pixels that are not set (Step 144).

The pixel determined to have no color fringe in the luminance detection is then set as a normal pixel, and a set value thereof is recorded in the register (Step 150).

Subsequently, the gradient color detection is performed on the pixel with color fringe as determined in the luminance detection (Step 136), so as to determine whether a pixel with color fringe exists in the pixels that are not set (Step 146).

The pixel determined to have no color fringe in the gradient color detection is then set as a normal pixel, and a set value thereof is recorded in the register (Step 150).

Moreover, the pixel with color fringe as determined in the gradient color detection is set as a color fringe pixel. In other words, only the pixel determined to have color fringe according to all the results of the specific color detection, the luminance detection, and the gradient color detection is set as a color fringe pixel, and a position of the pixel with color fringe is recorded to generate a color fringe map (Step 160).

Next, it is determined whether setting of all the pixels in the image is completed (Step 170), that is, it is determined whether the detection of color fringe is performed on all the pixels in the image.

If the setting (detection of color fringe) of all the pixels is not completed yet, a next pixel is selected (Steps 172 and 131) so that detection of color fringe is performed on the selected pixel through the specific color detection, the luminance detection, and the gradient color detection (Steps 132, 142, 134, 144, 136, and 146).

When the setting of all the pixels in the image is completed, a color fringe map is generated according to the recorded position of the pixel with color fringe (Step 180), and a correction procedure is performed. In the correction procedure, the value of the normal pixel is reserved and the value of the color fringe pixel is corrected (Step 40), so as to obtain the corrected image.

Here, although the detection procedures are implemented in the sequence of the specific color detection, the luminance detection, and the gradient color detection, the present invention is not limited thereto. That is to say, the detection procedures may also be implemented in a sequence of the luminance detection, the gradient color detection, and the specific color detection. Particularly, the luminance detection is first performed. The gradient color detection is then performed on a pixel with color fringe as determined in the luminance detection. Afterward, the specific color detection is performed on the pixel with color fringe as determined in the gradient color detection. Alternatively, the detection procedures may also be implemented in a sequence of the gradient color detection, the specific color detection, and the luminance detection. Particularly, the gradient color detection is first performed. The specific color detection is then performed on a pixel with color fringe as determined in the gradient color detection. Afterward, the luminance detection is performed on the pixel with color fringe as determined in the specific color detection. Similarly, the detection procedures may also be implemented in a sequence of the luminance detection, the specific color detection, and the gradient color detection, or a sequence of the gradient color detection, the luminance detection, and the specific color detection, or a sequence of the specific color detection, the gradient color detection, and the luminance detection.

In the specific color detection (Step 132), chrominance information about the pixel and pre-defined chrominance ranges of multiple colors are used to determine whether color fringe occurs to the selected pixel.

Figure 5A:
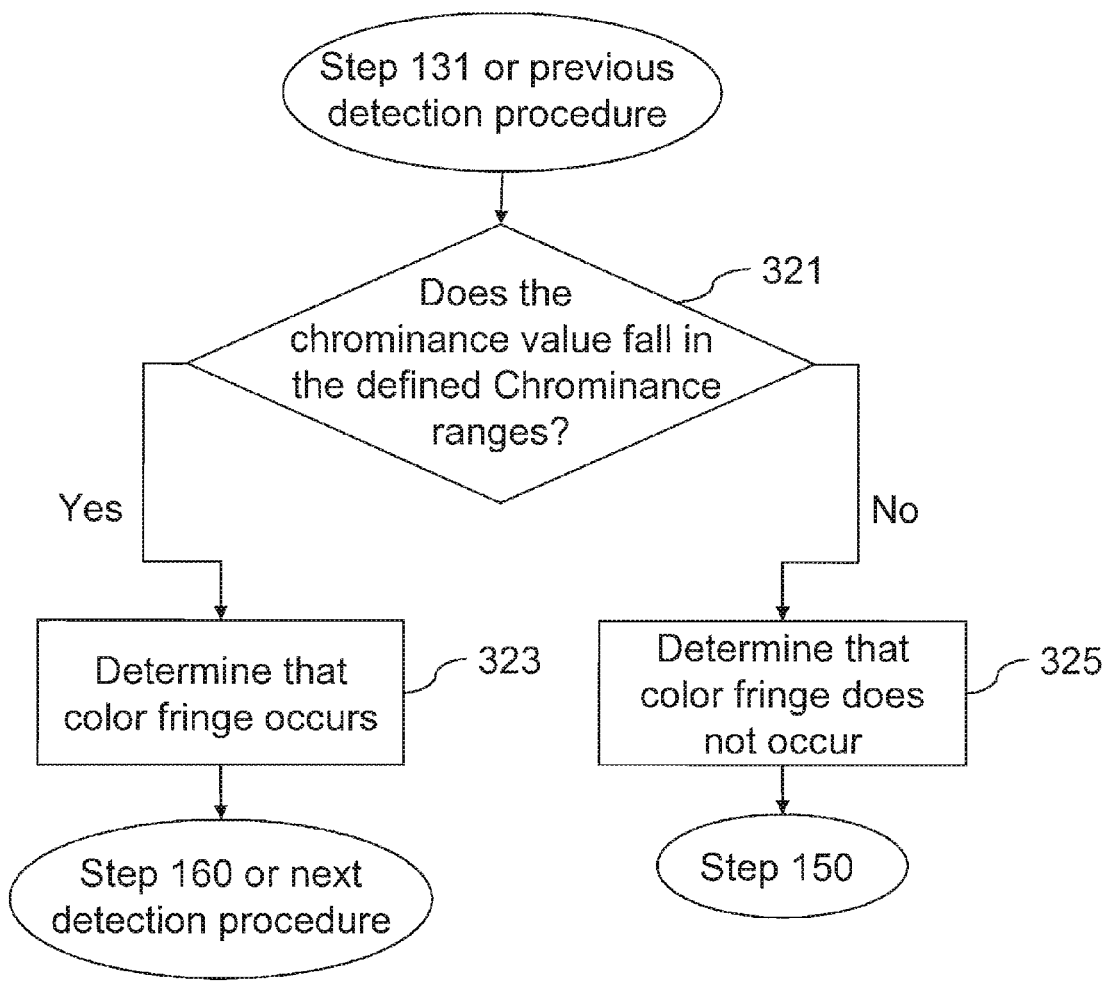
FIG. 5A is a flow chart of specific color detection according to an embodiment of the present invention.

Referring to FIG. 5A at the same time, during the specific color detection (Step 132), a chrominance value of a pixel that is not set is analyzed according to the pre-defined chrominance ranges of the multiple colors, so as to determine whether the chrominance value of the pixel that is not set falls in the defined chrominance ranges (Step 321). The chrominance value may comprise a blue chrominance (Cb) signal and a red chrominance (Cr) signal in the YCbCr signal.

When the specific color detection is first performed, the pixel that is not set is the selected pixel. When the specific color detection is not first performed, the pixel that is not set is the pixel with color fringe as determined in the previous detection procedure.

Moreover, it is determined that color fringe occurs to the pixel having the chrominance value falling in the defined chrominance ranges of the multiple colors (Step 323). On the contrary, it is determined that color fringe does not occur to the pixel having the chrominance value falling out of the defined chrominance ranges of the multiple colors (Step 325).

In the specific color detection (Step 132), the chrominance ranges of the multiple colors are pre-defined according to areas where color fringe may possibly occur. For example, FIG. 4B shows the chrominance ranges where color fringe may occur. Referring to FIG. 4B, Block A is a chrominance block where color fringe may occur on a yellow area, Block B is a chrominance block where color fringe may occur on a red area, Block C is a chrominance block where color fringe may occur on a green area, and Block D is a chrominance block where color fringe may occur on a pink area. Therefore, the chrominance ranges of red and yellow are defined according to Block A, the chrominance range of red is defined according to Block B, the chrominance range of yellow is defined according to Block C, and the chrominance range of pink is defined according to Block D.

In this manner, the defined chrominance ranges of the multiple colors where color fringe may occur can be set as a plurality of corresponding chrominance range thresholds, and it is determined whether the chrominance value of the pixel being detected falls in the defined chrominance ranges through comparison between the chrominance value of the pixel and the set chrominance range thresholds.

Figure 5B:
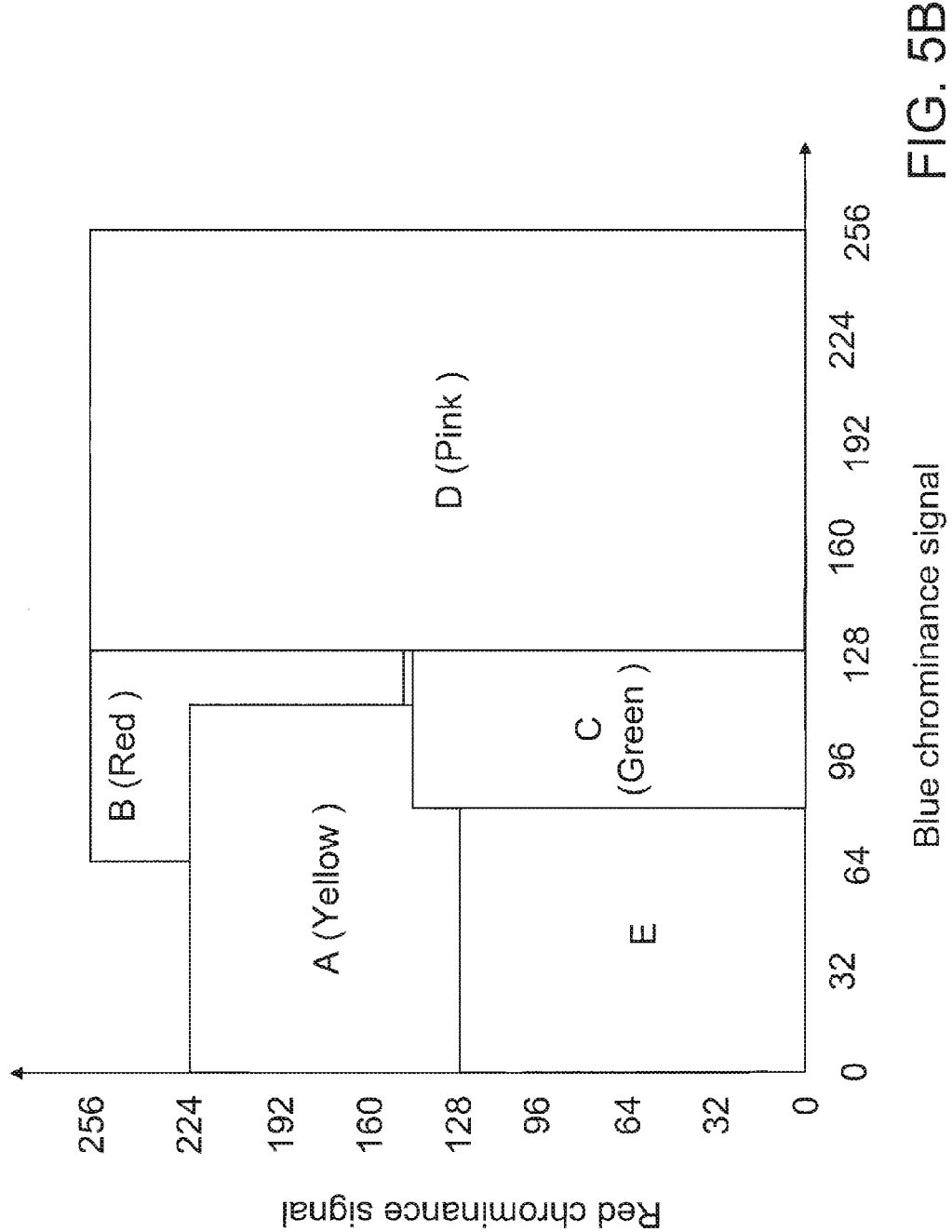
FIG. 5B is a schematic view of chrominance ranges of multiple colors according to an embodiment of the present invention.

In addition, a chrominance range threshold corresponding to an area outside the chrominance ranges (that is, a chrominance range where color fringe may not occur) is set according to the defined chrominance ranges of the multiple colors where color fringe may occur. Then, it is determined whether the chrominance value of the pixel being detected falls in the defined chrominance ranges through comparison between the chrominance value of the pixel and the set threshold. Taking FIG. 5B as an example, the setting of the chrominance range threshold corresponding to the area outside the chrominance ranges of the multiple colors where color fringe may occur is actually setting a chrominance range threshold for all the chrominance values in Block E.

In the luminance detection (Step 134), it is determined whether color fringe occurs to the selected pixel according to luminance information about the pixel. A pixel located in a high contrast area and a high luminance area among the pixels that are not set is then found with a K×K mask, in which K is 2x+1 and x is a positive integer greater than 1.

Here, the K×K mask is a reference area covering K×K pixels and spread with the pixel being detected as a center. In other words, the pixel being detected is a center pixel of the K×K mask, and the pixels except for the center pixel under the K×K mask are referred to as adjacent pixels.

When the luminance detection is first performed, the pixel that is not set is the selected pixel. When the luminance detection is not first performed, the pixel that is not set is the pixel with color fringe as determined in the previous detection procedure.

In other words, in the luminance detection (Step 134), two luminance determination procedures are performed. For ease of illustration, the two procedures are respectively referred to as a first luminance determination procedure and a second luminance determination procedure below.

The first luminance determination procedure is used to determine whether the pixel being detected is located in a high contrast area. The second luminance determination procedure is used to determine whether the pixel being detected is located in a high luminance area.

Figure 6A:
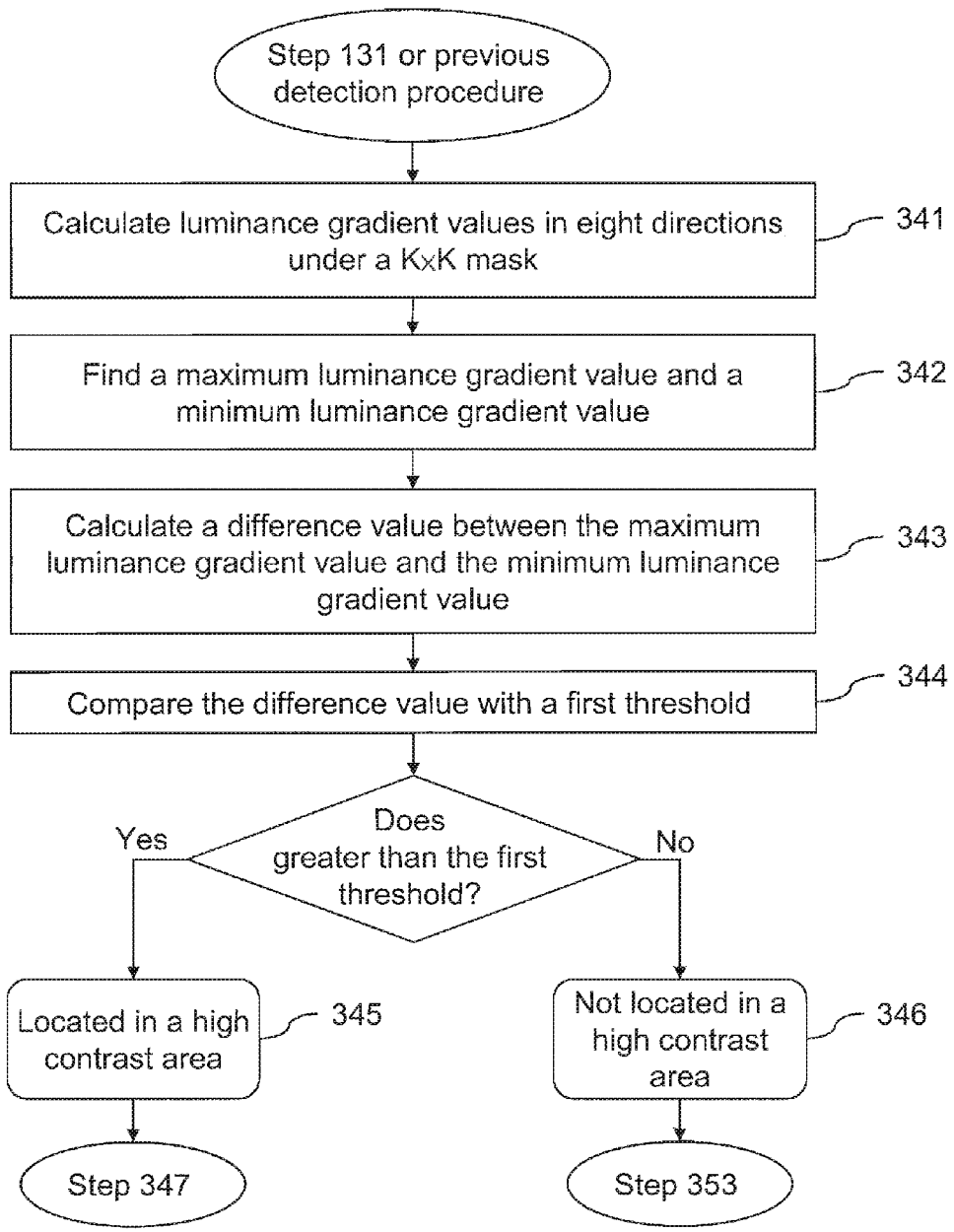
FIGS. 6A and 6B are flow charts of luminance detection according to an embodiment of the present invention.

Referring to FIG. 6A at the same time, in the first luminance determination procedure, luminance gradient values in eight directions under the K×K mask are first calculated (Step 341), that is, a sum of differences between adjacent pixels Pn and a center pixel Po is calculated for each direction respectively.

Taking a 5×5 mask as an example, referring to FIGS. 7A to 7H, the eight directions comprise a direction Dir0 (right), a direction Dir1 (upper right), a direction Dir2 (up), a direction Dir3 (upper left), a direction Dir4 (left), a direction Dir5 (lower left), a direction Dir6 (down), and a direction Dir7 (lower right) denoted by dashed areas, respectively.

A center pixel Po and two adjacent pixels Pn exist in each direction.

A formula of the luminance gradient value is sum_Dirj=(Y1−Yc)+(Y2−Yc).

In the formula, j is an integer between 0 and 7, which indicates a direction, Yc represents a luminance value of the center pixel Po, and Y1 and Y2 represent luminance values of the two adjacent pixels Pn respectively.

A maximum luminance gradient value and a minimum luminance gradient value in the obtained eight luminance gradient values are found (Step 342).

A difference value between the maximum luminance gradient value and the minimum luminance gradient value is calculated (Step 343).

The difference value between the maximum luminance gradient value and the minimum luminance gradient value is then compared with a first threshold (Step 344).

When the difference value between the maximum luminance gradient value and the minimum luminance gradient value is greater than the first threshold, it is determined that the center pixel Po is located in a high contrast area (Step 345), that is, the pixel being detected is located in a high contrast area.

When the difference value between the maximum luminance gradient value and the minimum luminance gradient value is smaller than or equal to the first threshold, it is determined that the center pixel Po is not located in a high contrast area (Step 346), that is, the pixel being detected is not located in a high contrast area.

Next, the second luminance determination procedure is performed on the pixel determined to be located in the high contrast area (that is, Step 347 is performed subsequently). It is determined that color fringe does not occur to the pixel determined to be not located in the high contrast area (Step 353).

Figure 6B:
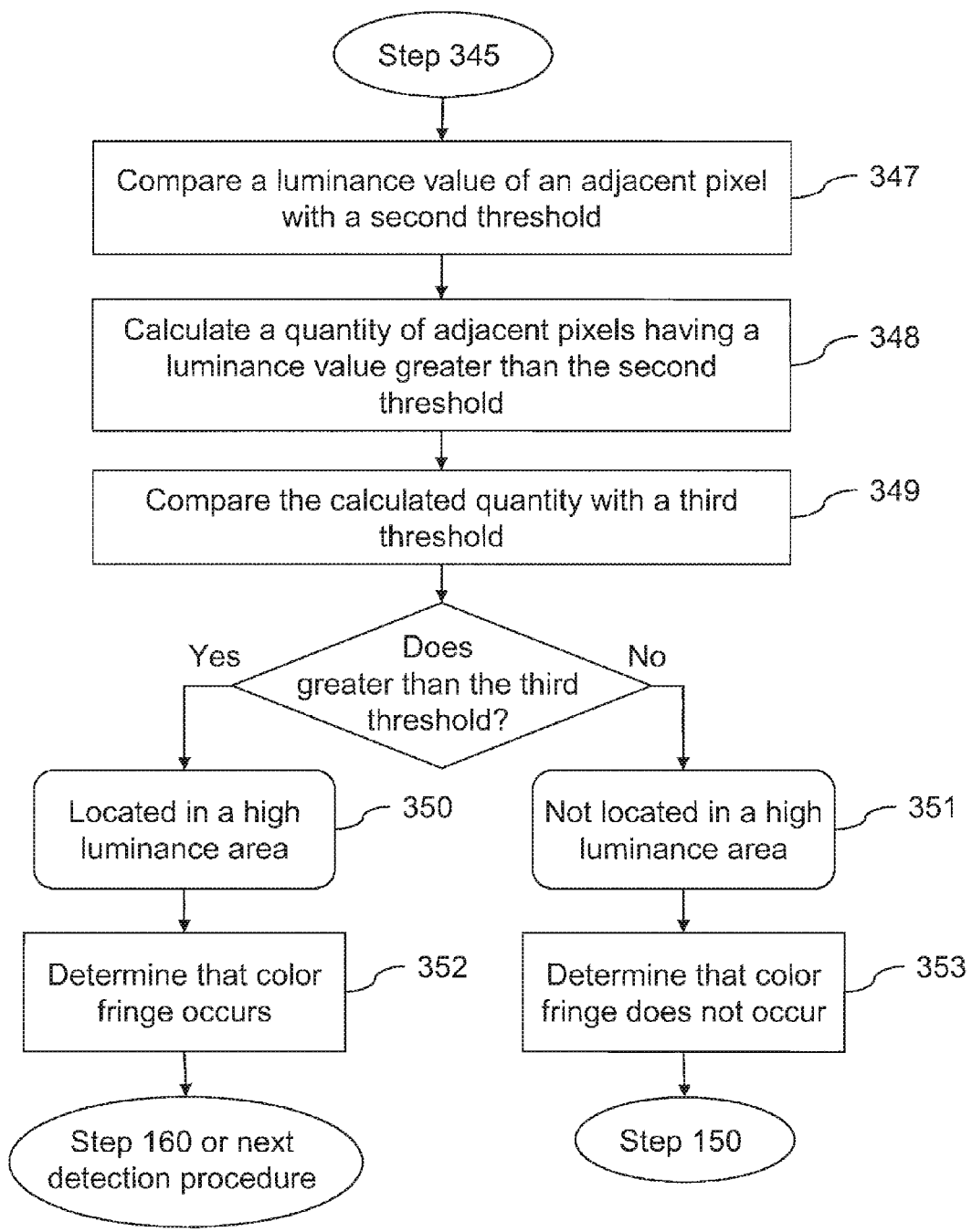

Referring to FIG. 6B, in the second luminance determination procedure, the luminance values of all the adjacent pixels Pn under the K×K mask are first compared with a second threshold respectively (Step 347), and a quantity of the adjacent pixels having luminance values greater than the second threshold is calculated (Step 348).

Next, the calculated quantity is compared with a third threshold (Step 349).

When the calculated quantity is greater than the third threshold, it is determined that the center pixel Po is located in a high luminance area (Step 350), that is, the pixel being detected is located in a high luminance area.

When the calculated quantity is smaller than or equal to the third threshold, it is determined that the center pixel Po is not located in a high luminance area (Step 351), that is, the pixel being detected is not located in a high luminance area.

Next, it is determined that color fringe occurs to the pixel determined to be located in the high luminance area (Step 352), that is, it is determined that color fringe occurs to the pixel located in the high contrast area and the high luminance area (the pixel being detected). It is determined that color fringe does not occur to the pixel determined to be not located in the high luminance area (Step 353).

Here, the "first" and "second" are used to differentiate two different procedures and have no particular sequence in implementation. In other words, the sequence of implementing the first luminance determination procedure and the second luminance determination procedure can be randomly exchanged. That is, the second luminance determination procedure is first performed, and the first luminance determination procedure is subsequently performed on the pixel determined to be located in the high luminance area in the second luminance determination procedure.

That is to say, in the luminance detection, it is only determined that color fringe occurs to the pixel located in both the high contrast area and the high luminance area among the pixels that are not set.

In the gradient color detection (Step 136), it is determined whether color fringe occurs to a selected pixel through luminance information and chrominance information about the pixel according to a gradient status of the image. Here, an M×M mask is used to find a pixel located in a non-smooth area, a gradational color area, an area appearing gradational variation from bright to dark, and an adjacent area appearing bright neutral color among the pixels that are not set, in which M is 2y+1, and y is a positive integer greater than 1. Thus, in the gradient color detection (Step 136), a mask having the same size as that in the luminance detection (Step 134) may be used, that is, M is equal to K. In the gradient color detection (Step 136), a mask having a different size from that in the luminance detection (Step 134) may also be used, that is, M is unequal to K.

Here, the M×M mask covering M×M pixels is spread with the pixel being detected as a center. In other words, the pixel being detected is a center pixel of the M×M mask, and the pixels except for the center pixel under the M×M mask are referred to as adjacent pixels.

When the gradient color detection is first performed, the pixel that is not set is the selected pixel. When the gradient color detection is not first performed, the pixel that is not set is the pixel with color fringe as determined in the previous detection procedure.

In other words, in the gradient color detection (Step 136), four gradient determination procedures are performed. For ease of illustration, the four procedures are respectively referred to as a first gradient determination procedure, a second gradient determination procedure, a third gradient determination procedure, and a fourth gradient determination procedure below.

The first gradient determination procedure is used to determine whether the pixel being detected is located in a non-smooth area. The second gradient determination procedure is used to determine whether the pixel being detected is located in a gradational color area. The third gradient determination procedure is used to determine whether the pixel being detected is located in an area appearing gradational variation from bright to dark. The fourth gradient determination procedure is used to determine whether the pixel being detected is located in an adjacent area appearing bright neutral color.

In the first gradient determination procedure, a quantity of pixels whose pixel value is close to that of the pixel in the center in the adjacent areas to the center under the M×M mask is calculated to determine whether the pixel being detected is located in the non-smooth area. That is, a quantity of adjacent pixels whose pixel value is close to that of the center pixel under the M×M mask is calculated.

Figure 8A:
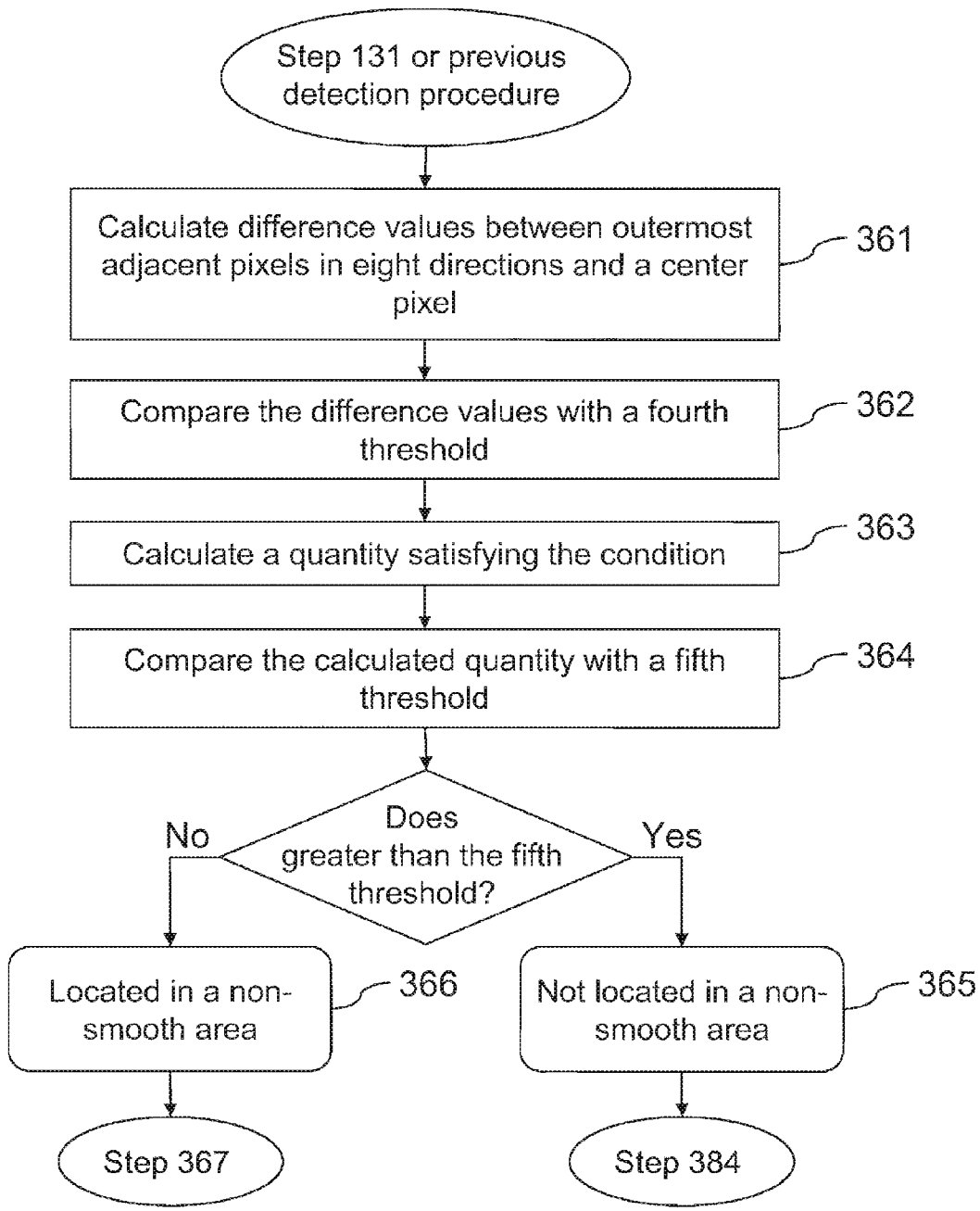
FIGS. 8A, 8B, 8C, and 8D are flow charts of gradient color detection according to an embodiment of the present invention.

Referring to FIGS. 8A and 9, first, difference values between outermost adjacent pixels P00, P02, P04, P20, P24, P40, P42, and P44 in eight directions and a center pixel P22 under the M×M mask are calculated (that is, difference values of YCbCr signals are calculated) (Step 361). In FIG. 9, a 5×5 mask is taken as an example, that is, M is equal to 5, but the present invention is not limited thereto. In the 5×5 mask, P00, P01, P02, P03, P04, P10, P11, P12, P13, P14, P20, P21, P23, P24, P30, P31, P32, P33, P40, P41, P42, P43, and P44 are adjacent pixels of the center pixel P22.

Moreover, the obtained difference values between the outermost adjacent pixels P00, P02, P04, P20, P24, P40, P42, and P44 and the center pixel P22 are compared with a fourth threshold respectively (Step 362). Here, the fourth threshold may be a single value or a limited value range. When the fourth threshold is a single value, an absolute value of the difference value is compared with the threshold.

A quantity of difference values satisfying a certain condition is calculated, that is, a quantity of difference values (absolute values) smaller than or equal to the fourth threshold is calculated or a quantity of difference values falling in the fourth threshold is calculated (Step 363).

The calculated quantity is compared with a fifth threshold (Step 364).

When the calculated quantity is greater than the fifth threshold, it is determined that the center pixel P22 is located in a smooth area, that is, the pixel being detected is not located in a non-smooth area (Step 365).

When the calculated quantity is smaller than or equal to the fifth threshold, it is determined that the center pixel P22 is not located in a smooth area, that is, the pixel being detected is located in a non-smooth area (Step 366).

Next, the second gradient determination procedure is performed on the pixel determined to be located in the non-smooth area (that is, Step 367 is performed subsequently). It is determined that color fringe does not occur to the pixel determined to be not located in the non-smooth area (Step 384).

In the second gradient determination procedure, it is determined whether the pixel being detected is located in the gradational color area by detecting whether a pixel (adjacent pixel) in an opposite direction to a direction having the maximum luminance gradient value under the M×M mask is close to the pixel value of the center pixel.

Figure 8B:
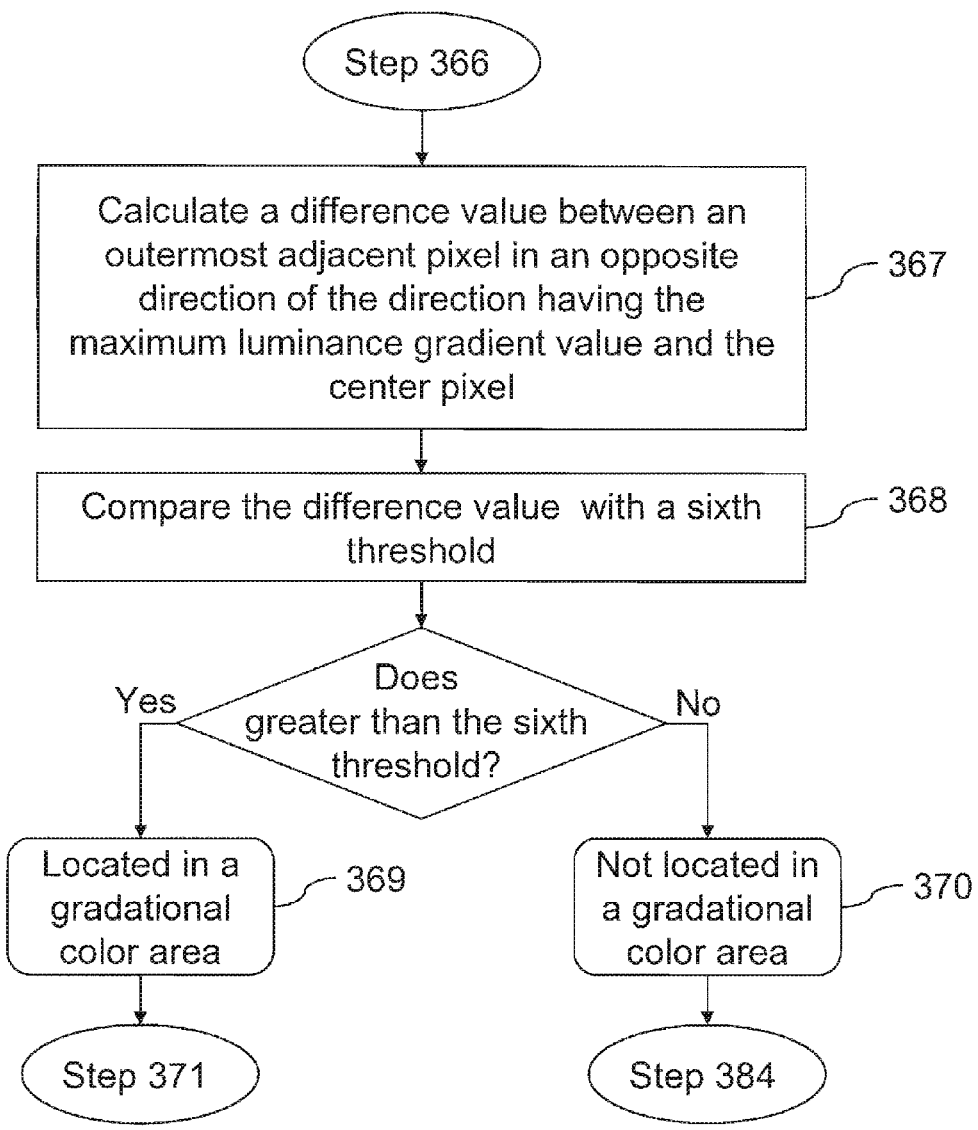

Referring to FIG. 8B, first, a difference value between an outermost adjacent pixel in an opposite direction of the direction having the maximum luminance gradient value among the eight directions and the center pixel under the M×M mask is calculated (that is, a difference value of a YCbCr signal is calculated) (Step 367), and the difference value is compared with a sixth threshold (Step 368).

Figure 7A:
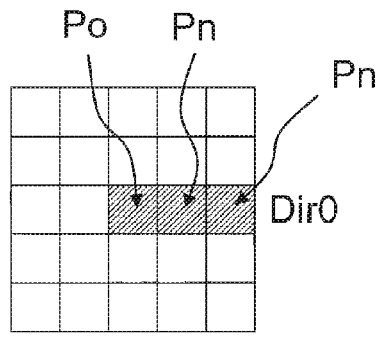
FIGS. 7A, 7B, 7C, 7D, 7E, 7F, 7G, and 7H are schematic views of eight directions under a 5×5 mask.
Figure 7B:
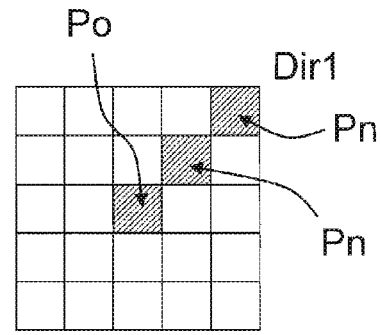
Figure 7C:
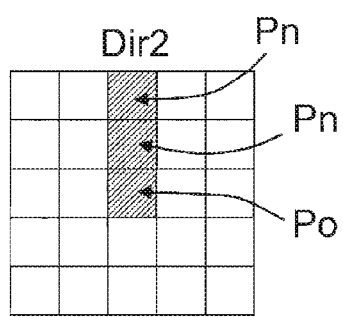
Figure 7D:
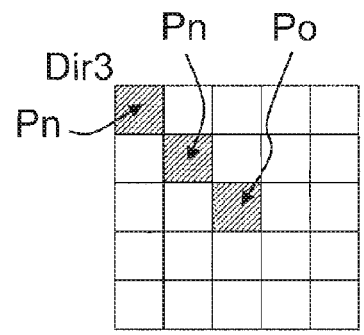
Figure 7E:
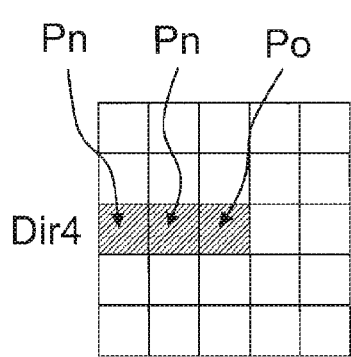
Figure 7F:
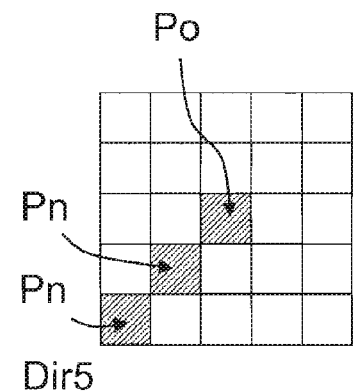
Figure 7G:
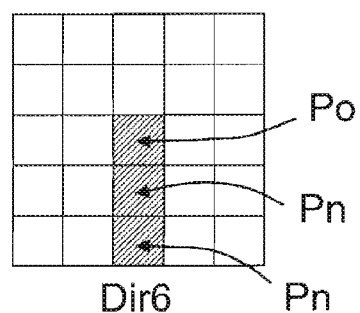
Figure 7H:
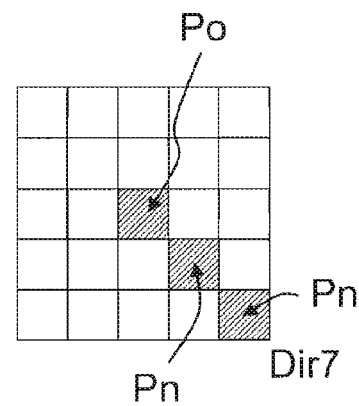

For example, it is assumed that the direction having the maximum luminance gradient value is the direction Dir0 as shown in FIG. 7A, and the opposite direction of the direction having the maximum luminance gradient value is the direction Dir4 as shown in FIG. 7E. Therefore, corresponding to FIG. 9, a difference value between the adjacent pixel P20 and the center pixel P22 is calculated.

A mode of obtaining the direction having the maximum luminance gradient value is basically the same as the above Steps 341 and 342. In other words, when the luminance detection (Step 134) is performed before the gradient color detection (Step 136), in the gradient color detection (Step 136), the direction having the maximum luminance gradient value can be acquired through Step 341 in the luminance detection (Step 134). On the contrary, when the luminance detection (Step 134) is performed after the gradient color detection (Step 136), in the gradient color detection (Step 136), Step 341 can be first performed to acquire the direction having the maximum luminance gradient value, and in the luminance detection (Step 134), Step 342 can be directly performed by skipping Step 341.

When the difference value is greater than the sixth threshold, it is determined that the center pixel P22 is located in a gradational color area, that is, the pixel being detected is located in a gradational color area (Step 369).

When the difference value is smaller than or equal to the sixth threshold, it is determined that the center pixel P22 is not located in a gradational color area, that is, the pixel being detected is not located in a gradational color area (Step 370).

Next, the third gradient determination procedure is performed on the pixel determined to be located in the gradational color area (that is, Step 371 is performed subsequently). It is determined that color fringe does not occur to the pixel determined to be not located in the gradational color area (Step 384).

In the third gradient determination procedure, it is determined whether the pixel being detected is located in the gradational color area by calculating a quantity of two adjacent pixels having similar colors in the direction having the maximum luminance gradient value and its opposite direction under the M×M mask.

Figure 8C:
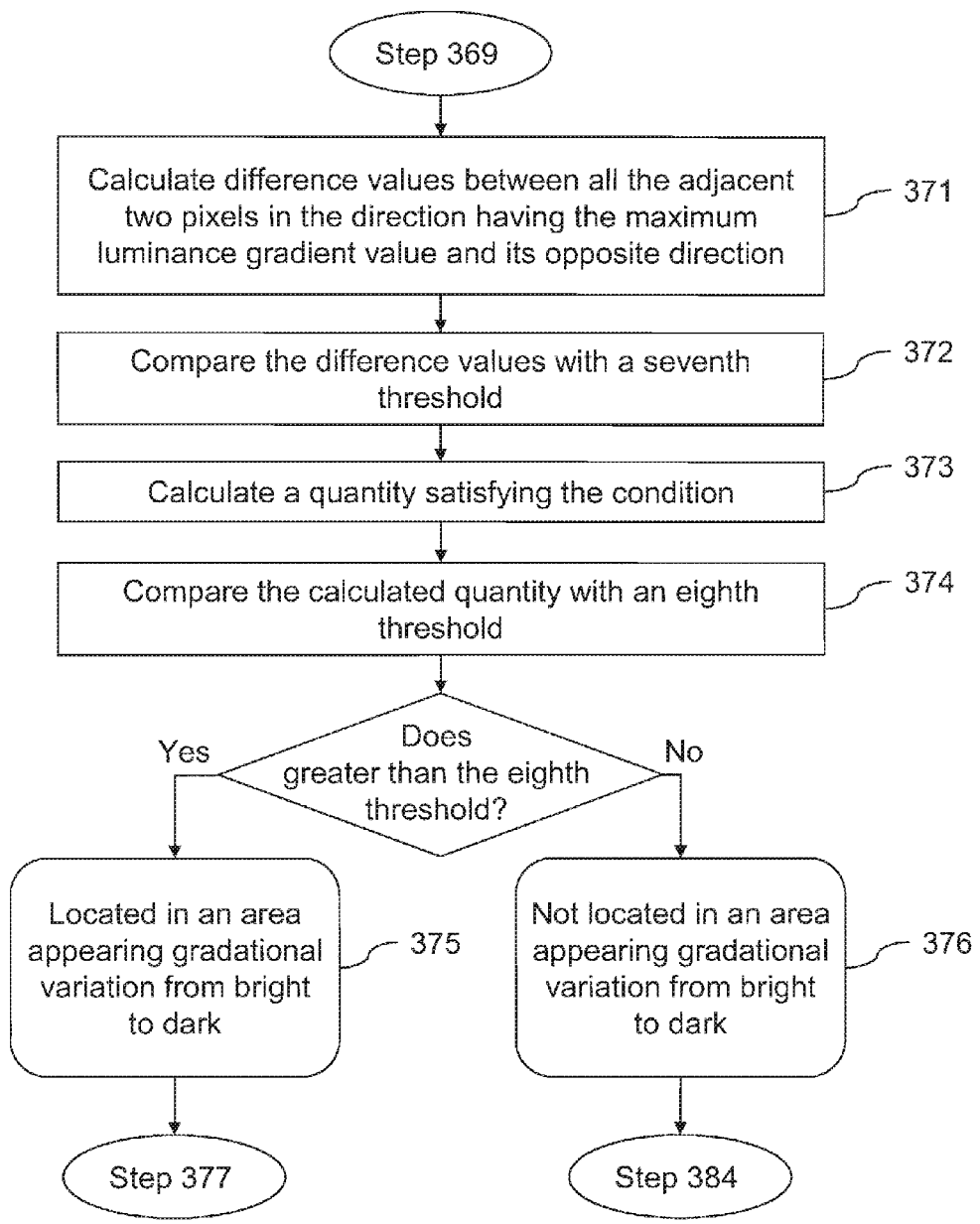

Referring to FIG. 8C, first, difference values between all the adjacent two pixels in the direction having the maximum luminance gradient value and its opposite direction under the M×M mask are calculated (that is, difference values of YCbCr signals are calculated) (Step 371), and the difference values are compared with a seventh threshold (Step 372).

Referring to FIG. 9, taking a 5×5 mask as an example, it is assumed that the direction having the maximum luminance gradient value is the direction Dir0 as shown in FIG. 7A, that is, difference values between all the adjacent two pixels (P20-P21, P21-P22, P22-P23, and P23-P24) in the directions Dir0 and Dir4 are calculated.

Here, the seventh threshold may be a single value or a limited value range. When the seventh threshold is a single value, an absolute value of the difference value is compared with the threshold.

A quantity of difference values satisfying a certain condition is calculated (Step 373). For example, a quantity of difference values (absolute values) greater than the seventh threshold is calculated or a quantity of difference values falling out of the seventh threshold is calculated.

The calculated quantity is compared with an eighth threshold (Step 374). According to a comparison result, it is determined whether the center pixel P22 is located in an area appearing gradational variation from bright to dark (that is, Step 375 or Step 376).

When the calculated quantity is greater than the eighth threshold, it is determined that the center pixel P22 is located in the area appearing gradational variation from bright to dark, that is, the pixel being detected is located in the area appearing gradational variation from bright to dark (Step 375).

When the calculated quantity is smaller than or equal to the eighth threshold, it is determined that the center pixel P22 is not located in the area appearing gradational variation from bright to dark, that is, the pixel being detected is not located in the area appearing gradational variation from bright to dark (Step 376).

In addition, if in Step 373 a quantity of difference values (absolute values) smaller than or equal to the seventh threshold is calculated or a quantity of difference values falling in the seventh threshold is calculated, the determination results of Steps 375 and 376 are opposite. That is, when the calculated quantity is greater than the eighth threshold, it is determined that the center pixel P22 is not located in the area appearing gradational variation from bright to dark; on the contrary, it is determined that the center pixel P22 is located in the area appearing gradational variation from bright to dark (not shown).

Next, the fourth gradient determination procedure is performed on the pixel determined to be located in the area appearing gradational variation from bright to dark (that is, Step 377 is performed subsequently). It is determined that color fringe does not occur to the pixel determined to be not located in the area appearing gradational variation from bright to dark (Step 384).

In the fourth gradient determination procedure, it is determined whether the pixel being detected is located in the adjacent area appearing bright neutral color by detecting whether a pixel in a bright area under the M×M mask is close to the neutral color.

Figure 8D:
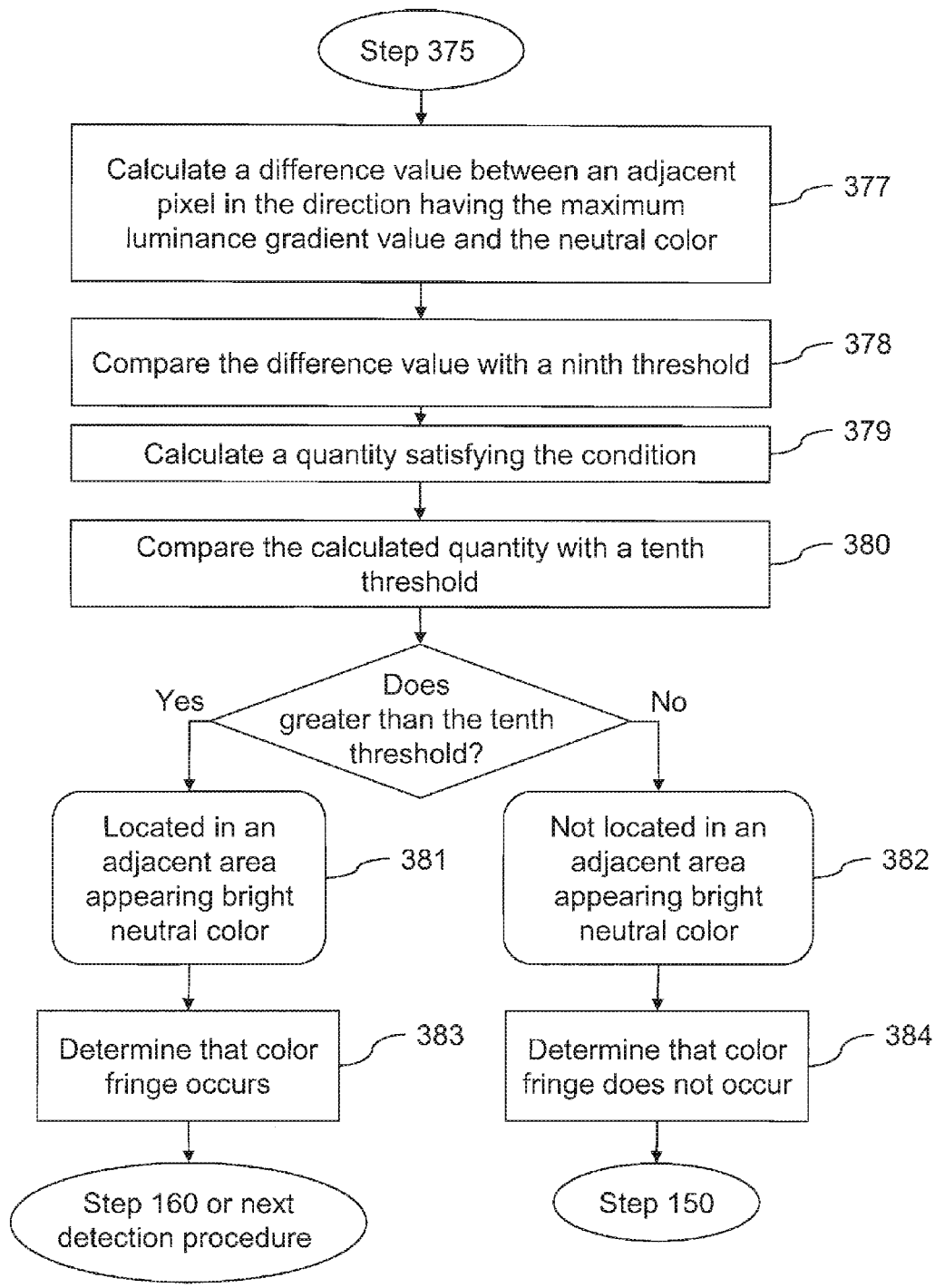

Referring to FIG. 8D, first, a difference value between an adjacent pixel in the direction having the maximum luminance gradient value among the eight directions under the M×M mask and the neutral color is calculated (that is, a difference value between the chrominance value of a YCbCr signal and the neutral color is calculated) (Step 377), and the difference value is compared with a ninth threshold (Step 378).

Referring to FIG. 9, taking a 5×5 mask as an example, it is assumed that the direction having the maximum luminance gradient value is the direction Dir0 as shown in FIG. 7A, that is, the difference values between all the adjacent pixels in the direction Dir0 and the neutral color are calculated (if Cb and Cr signals are between −127 and 127, the difference values are P23-0 and P24-0; and if the Cb and Cr signals are between 0 and 255, the difference values are P23-128 and P24-128).

Here, the ninth threshold may be a single value or a limited value range. When the ninth threshold is a single value, an absolute value of the difference value is compared with the threshold.

A quantity of difference values satisfying a certain condition is calculated. That is, a quantity of difference values (absolute values) smaller than or equal to the ninth threshold is calculated or a quantity of difference values falling in the ninth threshold is calculated (Step 379).

The calculated quantity is then compared with a tenth threshold (Step 380).

When the calculated quantity is greater than the tenth threshold, it is determined that the center pixel P22 is located in an adjacent area appearing bright neutral color, that is, the pixel being detected is located in an adjacent area appearing bright neutral color (Step 381).

When the calculated quantity is smaller than or equal to the tenth threshold, it is determined that the center pixel P22 is not located in an adjacent area appearing bright neutral color, that is, the pixel being detected is not located in an adjacent area appearing bright neutral color (Step 382).

Next, it is determined that color fringe occurs to the pixel determined to be located in the adjacent area appearing bright neutral color (that is, Step 383 is performed subsequently). It is determined that color fringe does not occur to the pixel determined to be not located in the adjacent area appearing bright neutral color (Step 384).

Here, the "first", "second", "third", and "fourth" are used to differentiate different procedures and have no particular sequence in implementation. In other words, the sequence of implementing the first gradient determination procedure, the second gradient determination procedure, the third gradient determination procedure, and the fourth gradient determination procedure can be randomly exchanged. That is, a next gradient determination procedure is subsequently performed on a pixel located in a corresponding specific area (that is, the non-smooth area, the gradational color area, the area appearing gradational variation from bright to dark, or the adjacent area appearing bright neutral color) as determined in a previous gradient determination procedure; and only a pixel located in a corresponding specific area (that is, the non-smooth area, the gradational color area, the area appearing gradational variation from bright to dark, or the adjacent area appearing bright neutral color) as determined in a final gradient determination procedure is determined as a pixel with color fringe.

That is to say, in the gradient color detection, it is only determined that color fringe occurs to the pixel located in the non-smooth area, the gradational color area, the area appearing gradational variation from bright to dark, or the adjacent area appearing bright neutral color among the pixels that are not set.

Here, two compensation methods can be adopted for correction. For ease of illustration, the methods are respectively referred to as a first compensation method and a second compensation method below.

The first compensation method is to compensate with adjacent points. The second compensation method is to compensate with a neutral color.

Moreover, it is determined to use the first compensation method or the second compensation method to compensate each color fringe pixel by detecting a smoothness of a dark area and a fringe status of adjacent pixels under an N×N mask, in which N is 2z+1, and z is a positive integer greater than 1. Thus, in the correction procedure (that is, Step 40), a mask having the same size as that in the luminance detection (Step 134) may be used, that is, N is equal to K. In the correction procedure (that is, Step 40), a mask having a different size from that in the luminance detection (Step 134) may also be used, that is, N is unequal to K. Similarly, in the correction procedure (that is, Step 40), a mask having the same size as that in the gradient color detection (Step 136) may be used, that is, N is equal to M. In the correction procedure (that is, Step 40), a mask having a different size from that in the gradient color detection (Step 136) may also be used, that is, N is unequal to M.

Figure 10:
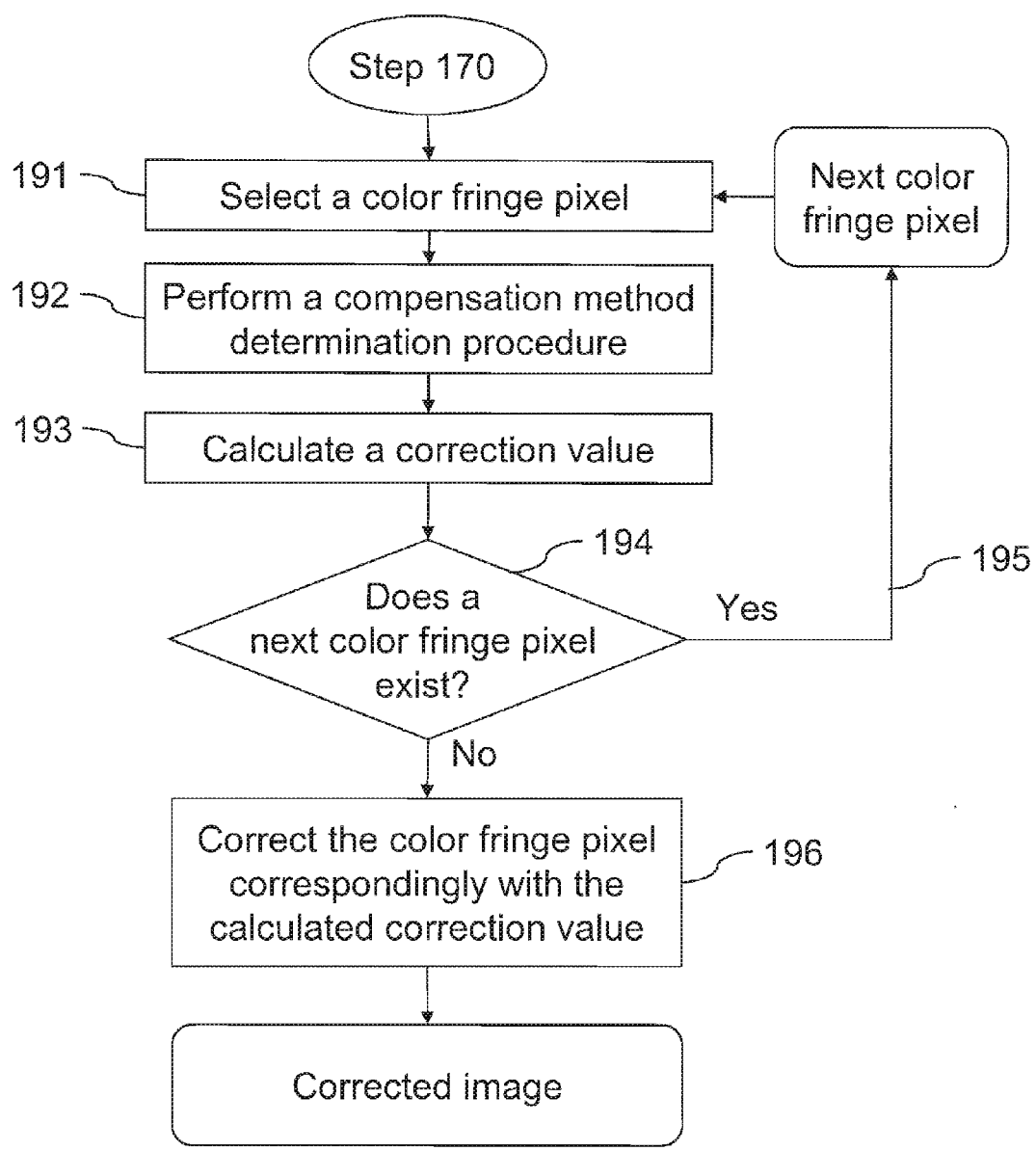
FIG. 10 is a flow chart of a correction procedure according to an embodiment of the present invention.

Referring to FIG. 10, in the correction procedure (that is, Step 40), a color fringe pixel is selected first (Step 191).

A compensation method determination procedure is performed on the selected color fringe pixel (Step 192), so as to determine a compensation method for the color fringe pixel according to the smoothness of the dark area and the fringe status of the adjacent pixels under the N×N mask. The N×N mask is a reference area covering N×N pixels and spread with the selected color fringe pixel as a center.

A correction value of the selected color fringe pixel is calculated through the determined compensation method (that is, the first compensation method or the second compensation method) (that is, Step 193). The calculated correction value may be first stored in a storage unit, for example, temporarily stored in a register.

Next, it is determined whether the calculation of correction values is performed on all the color fringe pixels in a digital image (Step 194).

If the calculation (calculation of correction values) for all the color fringe pixels is not completed yet, a next color fringe pixel is selected (Steps 195 and 191), and Steps 192, 193, and 194 are subsequently performed.

When the calculation of correction values for all the color fringe pixels in the digital image is completed, the color fringe pixel is suppressed with the calculated correction value, that is, the value of the normal pixel is reserved and a YCbCr signal of the color fringe pixel is correspondingly corrected by using the calculated correction value (Step 196), so as to obtain a corrected digital image.

In the compensation method determination procedure (Step 192), two status determination procedures are performed. For ease of illustration, the two procedures are respectively referred to as a first status determination procedure and a second status determination procedure below.

The first status determination procedure is used to analyze chrominance information to determine whether the calculated color fringe pixel is located in a dark smooth area. The second status determination procedure is used to determine whether an adjacent pixel of the calculated color fringe pixel is a color fringe pixel.

The dark smooth area means that the dark area under the mask has smooth color variations.

Figure 11:
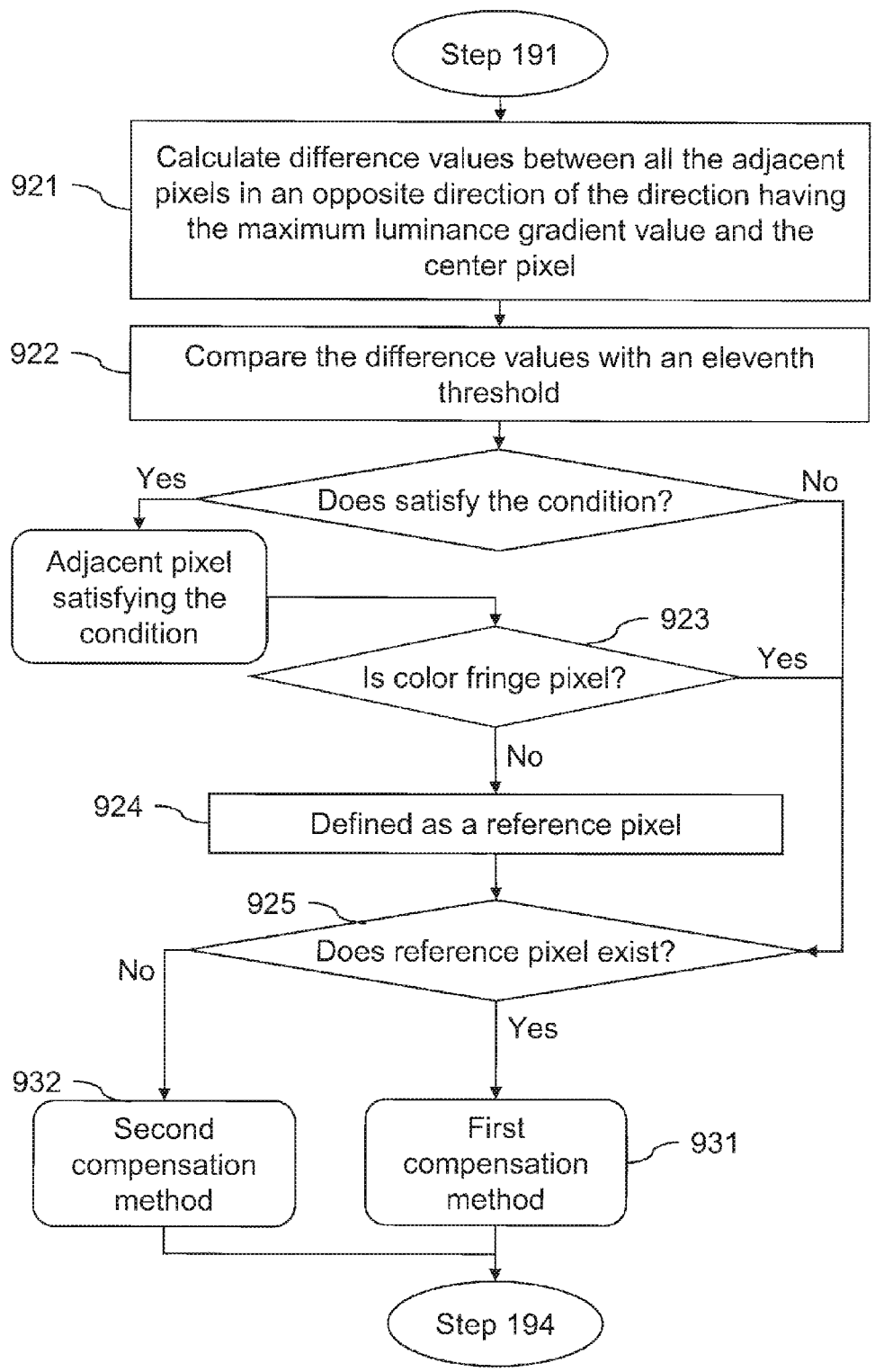
FIG. 11 is a flow chart of a compensation method determination procedure and correction value calculation according to an embodiment of the present invention.

Referring to FIG. 11, first, difference values between all the adjacent pixels in an opposite direction of the direction having the maximum luminance gradient value among the eight directions and the center pixel under the N×N mask are calculated (that is, difference values of chrominance values of YCbCr signals are calculated) (Step 921), and the difference values are compared with an eleventh threshold (Step 922).

For example, it is assumed that the direction having the maximum luminance gradient value is the direction Dir0 as shown in FIG. 7A, and the opposite direction of the direction having the maximum luminance gradient value is the direction Dir4 as shown in FIG. 7E. Therefore, corresponding to FIG. 9, a difference value between the chrominance values of the adjacent pixel P20 and the center pixel P22 and a difference value between the chrominance values of the adjacent pixel P21 and the center pixel P22 are calculated.

A mode of obtaining the direction having the maximum luminance gradient value is basically the same as the above Steps 341 and 342.

Here, the eleventh threshold may be a single value or a limited value range. When the eleventh threshold is a single value, an absolute value of the difference value is compared with the threshold.

The second status determination procedure is performed on the adjacent pixels satisfying a certain condition (Step 923). For example, the second status determination procedure is performed on an adjacent pixel having a difference value (absolute value) smaller than the eleventh threshold, or the second status determination procedure is performed on an adjacent pixel having the difference value falling in the eleventh threshold.

In the second status determination procedure, it is determined whether the adjacent pixel satisfying the condition is a color fringe pixel (Step 923).

The adjacent pixel that satisfies the condition but is not the color fringe pixel is defined as a reference pixel (Step 924).

It is determined whether a reference pixel exists (Step 925).

When the reference pixel exists, the correction value of the selected color fringe pixel is calculated through the first compensation method (Step 931). The first compensation method may calculate an average value of chrominance values of all the reference pixels, and the average value serves as a correction value for the selected color fringe pixel.

When the reference pixel does not exist, the correction value of the selected color fringe pixel is calculated through the second compensation method (Step 932).

The second compensation method (that is, Step 932) comprises the following steps.

First, an adjacent pixel having the maximum luminance value in the direction having the maximum luminance gradient value among the eight directions under the N×N mask is found. A chrominance difference value between the adjacent pixel having the maximum luminance value and the center pixel is calculated. A correction value of the center pixel (the selected color fringe pixel) is calculated with the calculated difference value, so as to suppress the center pixel to the neutral color.

Here, the "first" and "second" are used to differentiate two different procedures and have no particular sequence in implementation. In other words, the sequence of implementing the first status determination procedure and the second status determination procedure can be randomly exchanged. That is, in addition to the above sequence, the second status determination procedure may also be first performed, and the first status determination procedure is subsequently performed on the adjacent pixel determined to be located in the opposite direction of the direction having the maximum luminance gradient value and have no color fringe in the second status determination procedure.

The first compensation method (Step 931) is performed according to Formulae 1 and 2 below:

$$Cb\_correction_{P_o} = Cb_{average}; \quad \text{Formula 1}$$

$$Cr\_correction_{P_o} = Cr_{average}; \quad \text{Formula 2}$$

The second compensation method (Step 932) is performed according to Formulae 3 and 4 below:

$$Cb\_correction_{P_o} = 128 + \frac{(Cb_{P_o} - 128) \times (256 - CbCr\_Diff)}{256}; \quad \text{Formula 3}$$

$$Cr\_correction_{P_o} = 128 + \frac{(Cr_{P_o} - 128) \times (256 - CbCr\_Diff)}{256}; \quad \text{Formula 4}$$

In the above formulae, Po represents a center pixel, that is, a selected color fringe pixel.

$Cb_{P_o}$ represents a chrominance value of a blue chrominance of the center pixel.

$Cb_{average}$ represents an average value of blue chrominance values of all the reference pixels.

$Cr_{P_o}$ represents a chrominance value of a red chrominance of the center pixel.

$Cr_{average}$ represents an average value of red chrominance values of all the reference pixels.

$Cb\_correction_{P_o}$ represents a correction value for the blue chrominance of the center pixel.

$Cr\_correction_{P_o}$ represents a correction value for the red chrominance of the center pixel.

CbCr_Diff represents a maximum difference value between the blue chrominance and the red chrominance of an adjacent pixel having the maximum luminance value and the center pixel.

According to the embodiment in FIG. 1, the blending procedure (Step 54) is performed according to the following equations.

$$\text{switch}(F_1(x, y), F_2(x, y))$$

$$\text{case}(n, n):$$
$$Po(x, y) = w_1 \times P_1(x, y) + (1 - w_1) \times P_2(x, y)$$

$$\text{case}(n, n-1):$$
$$Po(x, y) = w_2 \times P_1(x, y) + (1 - w_2) \times P_2(x, y)$$

$$\vdots$$

$$\text{case}(n, 1):$$
$$Po(x, y) = w_n \times P_1(x, y) + (1 - w_n) \times P_2(x, y)$$

$$\text{case}(n, 0):$$
$$Po(x, y) = w_{n+1} \times P_1(x, y) + (1 - w_{n+1}) \times P_2(x, y)$$

$$\text{case}(0, n):$$
$$Po(x, y) = w_{n+2} \times P_1(x, y) + (1 - w_{n+2}) \times P_2(x, y)$$

-continued $$\text{case}(0, n-1):$$
$$Po(x, y) = w_{n+3} \times P_1(x, y) + (1 - w_{n+3}) \times P_2(x, y)$$

$$\vdots$$

$$\text{case}(0, 1):$$
$$Po(x, y) = w_{2n+1} \times P_1(x, y) + (1 - w_{2n+1}) \times P_2(x, y)$$

$$\text{case}(0, 0):$$
$$Po(x, y) = P_1(x, y)$$

$F_1$ represents a color fringe map corresponding to a digital image. $F_1(x,y)$ represents a value at coordinates (x,y) in the color fringe map corresponding to the digital image (the value is 0 or n, and n is a positive integer).

$F_2$ represents a color fringe map having a first resolution R1 enlarged from a color fringe map corresponding to a variable-size image. $F_2(x,y)$ represents a value at coordinates (x,y) in the color fringe map having the first resolution R1 enlarged from the color fringe map corresponding to the variable-size image (the value is a positive integer between 0 and n).

case(,) represents a value at coordinates (x,y) in the color fringe map corresponding to a digital image and the color fringe map having the first resolution R1 enlarged from the color fringe map corresponding to the variable-size image.

$P_1$ represents a corrected digital image. $P_1(x,y)$ represents a point (a pixel) at coordinates (x,y) in the corrected digital image.

$P_2$ represents an image having the first resolution R1 enlarged from the corrected variable-size image. $P_2(x,y)$ represents a point (a pixel) at coordinates (x,y) in the image having the first resolution R1 enlarged from the corrected variable-size image. $W_1$ to $W_{2n+1}$ represent 2n+1 weight values, and each weight value falls in a range of 0 to 1.

In the method for removing color fringe in a digital image according to the present invention, detection and correction of color fringe are performed on an original-size image and a small-size image (that is, a digital image and a variable-size image) respectively, so as to generate respective corrected images and corresponding color fringe maps. Then, the corrected small-size image and its corresponding color fringe map are enlarged to the same resolution as the original-size image. Finally, the two corrected images are blended according to the respective corresponding color fringe maps. Compared with the original-size image, for the small-size image, a mask of the same size may cover more image frames. Therefore, the detection and correction of color fringe can be performed on an image with a small-size mask, so as to effectively remove color fringe in the digital image and obtain a bright color after correction, instead of, for example, being grayish. Moreover, the use of the small-size mask also effectively reduces the cost.

What is claimed is:

1. A method for removing color fringe in a digital image, comprising:
   obtaining a digital image;
   forming a variable-size image by reducing the digital image;
   performing detection of color fringe on the digital image, so as to find pixels with color fringe in the digital image, set each of the found pixels with color fringe as a color fringe pixel, and generate a color fringe map corresponding to the digital image according to a position of the color fringe pixel in the digital image;

performing detection of color fringe on the variable-size image, so as to find pixels with color fringe in the variable-size image, set each of the found pixels with color fringe as a color fringe pixel, and generate a color fringe map corresponding to the variable-size image according to a position of the color fringe pixel in the variable-size image;

correcting the color fringe pixel in the digital image through a correction procedure, so as to obtain the corrected digital image;

correcting the color fringe pixel in the variable-size image through a correction procedure, so as to obtain the corrected variable-size image;

enlarging the corrected variable-size image and the color fringe map corresponding to the variable-size image, so that the corrected variable-size image and the color fringe map corresponding to the variable-size image have the same resolution as the digital image; and blending the corrected digital image and the enlarged corrected variable-size image according to the color fringe map corresponding to the digital image and the enlarged color fringe map corresponding to the variable-size image.

2. The method for removing color fringe in the digital image according to claim 1, wherein the corrected variable-size image and the color fringe map corresponding to the variable-size image are enlarged linearly.

3. The method for removing color fringe in the digital image according to claim 1, wherein in the detection of color fringe of the digital image and the variable-size image, the detection procedure comprises:

analyzing a separated luminance and chrominance signal of each pixel through specific color detection, luminance detection, and gradient color detection, so as to determine whether color fringe occurs to each of the pixels, and set the pixel determined to have no color fringe according to results of the specific color detection, the luminance detection, and the gradient color detection as a normal pixel; and setting the pixel determined to have color fringe according to all the results of the specific color detection, the luminance detection, and the gradient color detection as a color fringe pixel.

4. The method for removing color fringe in the digital image according to claim 3, wherein the correction procedure comprises:

reserving the separated luminance and chrominance signal of the normal pixel; and correcting the separated luminance and chrominance signal of the color fringe pixel.

5. The method for removing color fringe in the digital image according to claim 3, wherein the specific color detection comprises:

analyzing a chrominance value of the separated luminance and chrominance signal of each pixel that is not set according to chrominance ranges of multiple colors;

determining that color fringe occurs to the pixel having the chrominance value falling in the chrominance ranges of the multiple colors; and determining that color fringe does not occur to the pixel having the chrominance value falling out of the chrominance ranges of the multiple colors.

6. The method for removing color fringe in the digital image according to claim 3, wherein the luminance detection comprises:

analyzing a luminance value of the separated luminance and chrominance signal of each pixel that is not set by using a K×K mask, so as to find a pixel located in a high contrast area and a high luminance area among the pixels that are not set, wherein K is 2x+1, x is a positive integer greater than 1, and the pixel being detected that is not set is located at a center of the K×K mask; and determining that color fringe occurs to the pixel located in the high contrast area and the high luminance area.

7. The method for removing color fringe in the digital image according to claim 3, wherein the gradient color detection comprises:

analyzing the luminance value and the chrominance value of the separated luminance and chrominance signal of each pixel that is not set by using an M×m mask, so as to find a pixel located in a non-smooth area, a gradational color area, an area appearing gradational variation from bright to dark, and an adjacent area appearing bright neutral color among the pixels determined to have no color fringe, wherein M is 2y+1, y is a positive integer greater than 1, and the pixel being detected determined to have no color fringe is located at a center of the M×M mask; and determining that color fringe occurs to the pixel located in the non-smooth area, the gradational color area, the area appearing gradational variation from bright to dark, and the adjacent area appearing bright neutral color.

8. The method for removing color fringe in the digital image according to claim 1, wherein the correction procedure comprises:

selecting a color fringe pixel from the set color fringe pixels;

performing a compensation method determination procedure on the selected color fringe pixel, wherein the compensation method determination procedure is to determine whether a compensation method for the selected color fringe pixel is a first compensation method or a second compensation method according to a smoothness of a dark area under an N×N mask and a fringe status of at least one adjacent pixel, N is 2z+1 and z is a positive integer greater than 1, the selected color fringe pixel is located at a center of the N×N mask, and each of the adjacent pixels is one of the pixels except for the selected color fringe pixel under the N×N mask;

calculating a correction value of the selected color fringe pixel through the determined compensation method; and correcting the separated luminance and chrominance signal of the selected color fringe pixel correspondingly according to the correction value, wherein the first compensation method is to suppress the selected color fringe pixel with the adjacent pixel, and the second compensation method is to suppress the selected color fringe pixel to a neutral color.

9. A method for removing color fringe in a digital image, comprising:

forming a second to $n^{th}$ images having different resolutions by reducing a first image having a first resolution, wherein the second to $n^{th}$ images have a second to $n^{th}$ resolutions respectively, the first resolution is a random multiple greater than 1 of the second resolution, and the resolutions gradually decrease from the second to the $n^{th}$ resolution;

performing detection of color fringe on the first to $n^{th}$ images, so as to find pixels with color fringe in each image among the first to $n^{th}$ images, set each of the found pixels with color fringe as a color fringe pixel, and generate a color fringe map corresponding to each of the images according to a position of each color fringe pixel;

correcting each color fringe pixel, so as to obtain the corrected first to $n^{th}$ images; and blending the corrected first to $n^{th}$ images according to the respective corresponding color fringe maps in sequence starting from a minimum resolution among the first to $n^{th}$ resolutions to obtain an output image, the procedure comprising:

Step A: enlarging the corrected $n^{th}$ image and the corresponding color fringe map from the $n^{th}$ resolution to the $(n-1)^{th}$ resolution;

Step B: blending the corrected $n^{th}$ image having the $(n-1)^{th}$ resolution and the corrected $(n-1)^{th}$ image according to the respective corresponding color fringe maps to obtain a blended image having the $(n-1)^{th}$ resolution and its corresponding color fringe map;

Step C: enlarging the newly obtained blended image and the color fringe map corresponding to the blended image to a sequentially greater resolution according to the first to $(n-1)^{th}$ resolutions, and then blending the newly obtained blended image having the sequentially greater resolution and the corrected image having the same resolution among the corrected first to $(n-2)^{th}$ images to obtain a new blended image and a color fringe map corresponding to the new blended image; and repeating Step C, until the blended image having the first resolution is obtained to serve as the output image.

10. The method for removing color fringe in the digital image according to claim 9, wherein the enlargement in Steps A and C is performed linearly.

11. The method for removing color fringe in the digital image according to claim 9, wherein the detection of color fringe comprises:

analyzing a separated luminance and chrominance signal of each pixel through specific color detection, luminance detection, and gradient color detection, so as to determine whether color fringe occurs to each of the pixels, and set the pixel determined to have no color fringe according to results of the specific color detection, the luminance detection, and the gradient color detection as a normal pixel; and setting the pixel determined to have color fringe according to all the results of the specific color detection, the luminance detection, and the gradient color detection as a color fringe pixel.

12. The method for removing color fringe in the digital image according to claim 11, wherein the correction of each color fringe pixel comprises:

reserving the separated luminance and chrominance signal of the normal pixel; and correcting the separated luminance and chrominance signal of the color fringe pixel.

13. The method for removing color fringe in the digital image according to claim 11, wherein the specific color detection comprises:

analyzing a chrominance value of the separated luminance and chrominance signal of each pixel that is not set according to chrominance ranges of multiple colors;

determining that color fringe occurs to the pixel having the chrominance value falling in the chrominance ranges of the multiple colors; and determining that color fringe does not occur to the pixel having the chrominance value falling out of the chrominance ranges of the multiple colors.

14. The method for removing color fringe in the digital image according to claim 11, wherein the luminance detection comprises:

analyzing a luminance value of the separated luminance and chrominance signal of each pixel that is not set by using a K×K mask, so as to find a pixel located in a high contrast area and a high luminance area among the pixels that are not set, wherein K is 2x+1, x is a positive integer greater than 1, and the pixel being detected that is not set is located at a center of the K×K mask; and determining that color fringe occurs to the pixel located in the high contrast area and the high luminance area.

15. The method for removing color fringe in the digital image according to claim 11, wherein the gradient color detection comprises:

analyzing the luminance value and the chrominance value of the separated luminance and chrominance signal of each pixel that is not set by using an M×M mask, so as to find a pixel located in a non-smooth area, a gradational color area, an area appearing gradational variation from bright to dark, and an adjacent area appearing bright neutral color among the pixels determined to have no color fringe, wherein M is 2y+1, y is a positive integer greater than 1, and the pixel being detected determined to have no color fringe is located at a center of the M×M mask; and determining that color fringe occurs to the pixel located in the non-smooth area, the gradational color area, the area appearing gradational variation from bright to dark, and the adjacent area appearing bright neutral color.

16. The method for removing color fringe in the digital image according to claim 9, wherein the correction of each color fringe pixel comprises:

selecting a color fringe pixel from the set color fringe pixels;

performing a compensation method determination procedure on the selected color fringe pixel, wherein the compensation method determination procedure is to determine whether a compensation method for the selected color fringe pixel is a first compensation method or a second compensation method according to a smoothness of a dark area under an N×N mask and a fringe status of at least one adjacent pixel, N is 2z+1 and z is a positive integer greater than 1, the selected color fringe pixel is located at a center of the N×N mask, and each of the adjacent pixels is one of the pixels except for the selected color fringe pixel under the N×N mask;

calculating a correction value of the selected color fringe pixel through the determined compensation method; and correcting the separated luminance and chrominance signal of the selected color fringe pixel correspondingly according to the correction value, wherein the first compensation method is to suppress the selected color fringe pixel with the adjacent pixel, and the second compensation method is to suppress the selected color fringe pixel to a neutral color.

* * * * *